(12) United States Patent
Zhao

(10) Patent No.: US 10,923,089 B2
(45) Date of Patent: Feb. 16, 2021

(54) METHOD AND APPARATUS FOR GENERATING DIGITAL SCORE FILE OF SONG, AND STORAGE MEDIUM

(71) Applicant: TENCENT TECHNOLOGY (SHENZHEN) COMPANY LIMITED, Shenzhen (CN)

(72) Inventor: Weifeng Zhao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/059,109

(22) Filed: Aug. 9, 2018

(65) Prior Publication Data
US 2018/0350336 A1    Dec. 6, 2018

Related U.S. Application Data

(63) Continuation of application No. PCT/CN2017/101008, filed on Sep. 8, 2017.

(30) Foreign Application Priority Data

Sep. 9, 2016 (CN) .......................... 2016 1 0816111

(51) Int. Cl.
*G10H 1/00* (2006.01)
*G10H 1/36* (2006.01)
(Continued)

(52) U.S. Cl.
CPC ......... *G10H 1/0025* (2013.01); *G06F 16/433* (2019.01); *G10G 3/04* (2013.01);
(Continued)

(58) Field of Classification Search
CPC ...... G10H 1/0025; G10H 1/361; G10H 3/125; G06F 16/433; G10G 3/04
(Continued)

(56) References Cited

U.S. PATENT DOCUMENTS 5,038,658 A * 8/1991 Tsuruta .................... G10G 3/04
84/461
5,693,903 A * 12/1997 Heidorn ................ G10H 1/361
84/609
(Continued)

FOREIGN PATENT DOCUMENTS

CN       1240978 A    1/2000
CN     101521788 A    9/2009
(Continued)

OTHER PUBLICATIONS

International Search Report dated Nov. 29, 2017 in PCT/CN2017/101008, with English translation, 6 pages.
(Continued)

*Primary Examiner* — David S Warren
*Assistant Examiner* — Christina M Schreiber
(74) *Attorney, Agent, or Firm* — Oblon, McClelland, Maier & Neustadt, L.L.P.

(57) ABSTRACT

A method and an information processing apparatus to generate a digital score file of a song are described. The information processing apparatus includes processing circuitry. The processing circuitry is configured to obtain a candidate audio file satisfying a first condition from audio files of unaccompanied singing of the song without instrumental accompaniment. The processing circuitry is configured to divide the candidate audio file into valid audio segments based on timing information of the song, and extract pieces of music note information from the valid audio segments. Each of the pieces of music note information includes at least one data set of a music note in the song. The data set includes an onset time, a duration, and a music note value of the music note. The processing circuitry is configured to generate the digital score file based on the pieces of music note information.

20 Claims, 12 Drawing Sheets

(51) Int. Cl.
  *G10H 3/12* (2006.01)
  *G10G 3/04* (2006.01)
  *G06F 16/432* (2019.01)

(52) U.S. Cl.
  CPC .............. *G10H 1/361* (2013.01); *G10H 3/125* (2013.01); *G10H 2210/061* (2013.01); *G10H 2210/066* (2013.01); *G10H 2210/071* (2013.01); *G10H 2210/086* (2013.01); *G10H 2220/011* (2013.01); *G10H 2220/015* (2013.01); *G10H 2220/451* (2013.01); *G10H 2230/015* (2013.01)

(58) Field of Classification Search
  USPC .......................................................... 84/616
  See application file for complete search history.

(56) References Cited

U.S. PATENT DOCUMENTS

| | | | | |
|---|---|---|---|---|
| 7,041,888 B2* | 5/2006 | Masuda | ............... | G10G 1/02 84/100 |
| 7,667,125 B2* | 2/2010 | Taub | ............... | G10H 1/00 84/616 |
| 8,829,322 B2* | 9/2014 | Walmsley | ............... | G10G 3/04 84/611 |
| 2003/0163524 A1* | 8/2003 | Gotoh | ............... | G10H 1/0058 709/203 |
| 2004/0020348 A1* | 2/2004 | Ishida | ............... | G10H 1/0058 84/609 |
| 2005/0115382 A1* | 6/2005 | Jung | ............... | G09B 15/00 84/616 |
| 2006/0130640 A1* | 6/2006 | Fujiwara | ............... | G10H 1/0058 84/626 |
| 2006/0150803 A1* | 7/2006 | Taub | ............... | G10H 1/0008 84/616 |
| 2009/0114079 A1* | 5/2009 | Egan | ............... | G09B 15/023 84/477 R |
| 2012/0297959 A1* | 11/2012 | Serletic | ............... | G09B 15/00 84/626 |
| 2016/0148606 A1* | 5/2016 | Minamitaka | ............... | G10H 1/38 84/609 |
| 2017/0092247 A1* | 3/2017 | Silverstein | ............... | G10H 1/368 |
| 2018/0293969 A1* | 10/2018 | Zhao | ............... | G10H 1/361 |
| 2018/0349495 A1* | 12/2018 | Zhao | ............... | G10H 1/365 |
| 2018/0350336 A1* | 12/2018 | Zhao | ............... | G06F 16/433 |

FOREIGN PATENT DOCUMENTS

| | | | |
|---|---|---|---|
| CN | 101968958 | A | 2/2010 |
| CN | 101894552 | A | 11/2010 |
| CN | 101916250 | A | 12/2010 |
| CN | 102014195 | A | 4/2011 |
| CN | 102521281 | A | 6/2012 |
| CN | 102522083 | A | 6/2012 |
| CN | 102547524 | A | 7/2012 |
| CN | 102880693 | A | 1/2013 |
| CN | 102915725 | A | 2/2013 |
| CN | 103440250 | A | 12/2013 |
| CN | 102522083 | B | 3/2014 |
| CN | 104143324 | A | 11/2014 |
| CN | 104200818 | A | 12/2014 |
| CN | 104978380 | A | 10/2015 |
| CN | 104978973 | A * | 10/2015 |
| CN | 104978973 | A | 10/2015 |
| CN | 105469807 | A | 4/2016 |
| CN | 105788589 | A | 7/2016 |
| CN | 106448630 | A | 2/2017 |
| JP | 2005196090 | A | 7/2005 |
| JP | 2012022221 | A | 2/2012 |

OTHER PUBLICATIONS

Written Opinion dated Nov. 29, 2017 in PCT/CN2017/101008, 5 pages.
Wen-Jun Zhang "File Format for Gong-Che Notation Musical Score Using MIDI 1.0 Protocol" Apr. 30, 2012.
Gengfang Chen "The Musical Information Extraction from Digital Musical Score Based on Mathematical Morphology and Musical Notation" Aug. 31, 2008.
Office Action dated Mar. 3, 2020 in Chinese Patent Application No. 201610816111.9, with concise English translation.

\* cited by examiner

METHOD AND APPARATUS FOR GENERATING DIGITAL SCORE FILE OF SONG, AND STORAGE MEDIUM

RELATED APPLICATION

This application is a continuation of International Application No. PCT/CN2017/101008, filed on Sep. 8, 2017, which claims priority to Chinese Patent Application No. 201610816111.9, entitled "METHOD AND APPARATUS FOR GENERATING DIGITAL SCORE FILE OF SONG, AND STORAGE MEDIUM" filed with the Chinese Patent Office on Sep. 9, 2016. The entire disclosures of the prior applications are hereby incorporated by reference in their entirety.

FIELD OF THE TECHNOLOGY

This application relates to the field of audio processing technologies.

BACKGROUND OF THE DISCLOSURE

Currently, digital score files are mainly produced manually. For example, some musical instrument digital interface (MIDI) files are produced manually. Due to manual participation during digital score file production, digital score file production costs are relatively high, and it is relatively time consuming and expensive to manually inspect the quality of a finished digital score file, resulting in relatively low digital score file production efficiency.

SUMMARY

Embodiments of this application provide a method and an apparatus for generating a digital score file of a song, and a storage medium, to resolve at least a technical problem of low digital score file production efficiency in related technologies.

According to an aspect of the application, a method for generating a digital score file of a song is provided. A candidate audio file satisfying a first condition is obtained by processing circuitry of an information processing apparatus from audio files of unaccompanied singing of the song without instrumental accompaniment. The candidate audio file is divided by the processing circuitry into valid audio segments based on timing information of the song. Pieces of music note information are extracted from the valid audio segments. Each of the pieces of music note information includes at least one data set of a music note in the song. The data set includes an onset time, a duration, and a music note value of the music note. The digital score file is generated based on the pieces of music note information.

According to an aspect of the application, an information processing apparatus is provided. The information processing apparatus includes processing circuitry. The processing circuitry is configured to obtain a candidate audio file satisfying a first condition from audio files of unaccompanied singing of a song without instrumental accompaniment. The processing circuitry is configured to divide the candidate audio file into valid audio segments based on timing information of the song, and extract pieces of music note information from the valid audio segments. Each of the pieces of music note information includes at least one data set of a music note in the song. The data set includes an onset time, a duration, and a music note value of the music note. The processing circuitry is configured to generate a digital score file based on the pieces of music note information.

According to an aspect of the application, a non-transitory computer-readable storage medium is provided. The non-transitory computer-readable storage medium stores a program executable by a processor to perform obtaining a candidate audio file satisfying a first condition from audio files of unaccompanied singing of a song without instrumental accompaniment. The program causes the processor to perform dividing the candidate audio file into valid audio segments based on timing information of the song, and extracting pieces of music note information from the valid audio segments. Each of the pieces of music note information includes at least one data set of a music note in the song. The data set includes an onset time, a duration, and a music note value of the music note. The program causes the processor to perform generating a digital score file based on the pieces of music note information.

In the embodiments of this application, a candidate cappella audio file satisfying a first condition is obtained from cappella audio files corresponding to a song, the cappella audio file including cappella data obtained when a user sings the song; the candidate cappella audio file is divided based on time information of the song to obtain a plurality of valid audio segments; note information of each valid audio segment is extracted, the note information including one or more triplets, and each triplet including a start time of a note, a duration of the note, and a note value of the note in a mapping relationship; and a digital score file is generated based on the note information of each valid audio segment, the digital score file including some or all of the triplets. As the digital score file is generated based on the cappella data obtained when the user sings the song corresponding to the candidate cappella audio file, automatic digital score file generation is achieved, and digital score file production efficiency is improved, thereby resolving a technical problem of low digital score file production efficiency in related technologies.

BRIEF DESCRIPTION OF THE DRAWINGS

The accompanying drawings described herein are used to provide a further understanding of this application, and form a part of this application. Exemplary embodiments of this application and descriptions thereof are used to explain this application, and do not constitute any inappropriate limitation to this application. In the accompanying drawings.

DESCRIPTION OF EMBODIMENTS

To make persons skilled in the art understand the technical solutions in this application better, the following describes the technical solutions in the embodiments of this application with reference to the accompanying drawings in the embodiments of this application. The described embodiments are merely some but not all of the embodiments of this application. All other embodiments obtained by persons of ordinary skill in the art based on the embodiments of this application shall fall within the protection scope of this application.

It should be noted that, in the specification, claims, and accompanying drawings of this application, the terms "first", "second", and the like are intended to distinguish between similar objects rather than indicate a specific order. It should be understood that the data termed in such a way are interchangeable in proper circumstances so that the embodiments of this application described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those steps or units expressly listed, but may include other steps or units not expressly listed or inherent to such a process, method, system, product, or device.

According to the embodiments of this application, an embodiment of a method for generating a digital score file of a song is provided.

Figure 1:
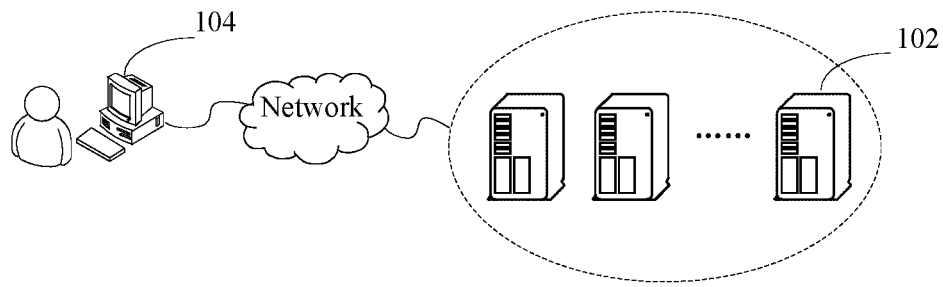
FIG. 1 is a schematic diagram of a hardware environment of a method for generating a digital score file of a song according to an embodiment of this application.

Optionally, in this embodiment, the method for generating a digital score file of a song may be applied to a hardware environment including a server 102 and a terminal 104 in FIG. 1. FIG. 1 is a schematic diagram of a hardware environment of a method for generating a digital score file of a song according to an embodiment of this application. As shown in FIG. 1, the server 102 is connected to the terminal 104 via a network. The network includes, but not limited to, a wide area network, a metropolitan area network, or a local area network. The terminal 104 is not limited to a personal computer (PC), a mobile phone, a tablet computer, or the like. The method for generating a digital score file of a song in this embodiment of this application may be performed by the server 102, or may be performed by the terminal 104, or may be performed by both the server 102 and the terminal 104. When being performed by the terminal 104, the method for generating a digital score file of a song in this embodiment of this application may be performed by a client installed on the terminal.

Figure 2:
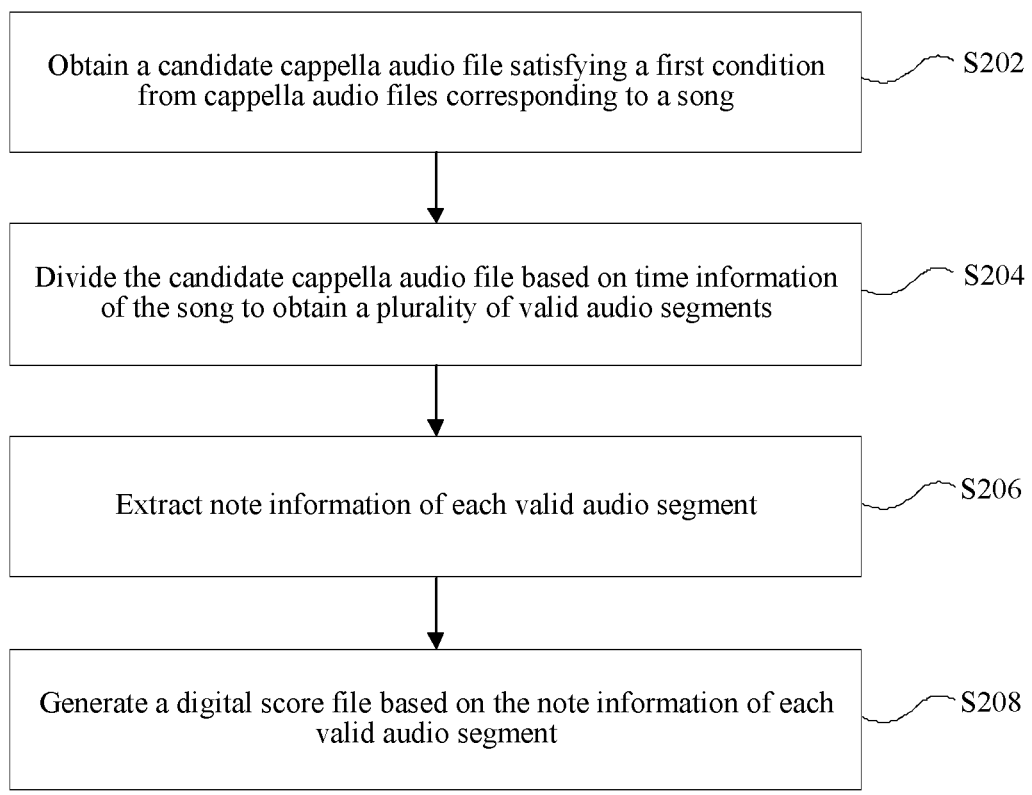
FIG. 2 is a flowchart of a method for generating a digital score file of a song according to an embodiment of this application.

FIG. 2 is a flowchart of a method for generating a digital score file of a song according to an embodiment of this application. As shown in FIG. 2, the method may include the following steps:

In step S202, obtain a candidate cappella audio file (or a candidate audio file) satisfying a first condition from cappella audio files (or audio files of unaccompanied singing without instrumental accompaniment) corresponding to a song.

The cappella audio file includes cappella data obtained when a user sings the song. The candidate cappella audio file is a cappella audio file satisfying the first condition. The first condition is a screening condition for screening out the candidate cappella audio file from the cappella audio files corresponding to the song, that is, determining whether a cappella audio file reaches a candidate criterion. For example, many other users score uploaded cappella audio files, each of the cappella audio files gets a corresponding score, and the first condition is set to a condition that a score is higher than a predetermined score threshold. For example, the cappella audio files are scored from 0 to 10, the first condition is set to a condition that a score is higher than 8, and then a cappella audio file having a score higher than the predetermined score threshold is determined as a candidate cappella audio file. Optionally, the users may alternatively evaluate the uploaded cappella audio files as, for example, "satisfactory", "unsatisfactory", "bad", "ordinary", "good", or "like", and the first condition is set to a condition that an evaluation result reaches a predetermined evaluation threshold. For example, the first condition is set to a condition that an evaluation result reaches 10 "satisfactory", 20 "good", or 30 "like", and then a cappella audio file whose evaluation result reaches the predetermined threshold is determined as a candidate cappella audio file.

Optionally, in addition to the screening condition, the first condition further includes a manual screening condition, that is, the screening condition is a preliminary screening condition in the first condition. For example, after it is determined that an uploaded cappella audio file reaches the preliminary screening condition, specific production personnel arrange an audition for the cappella audio file reaching the preliminary screening condition, to determine whether a singing pitch in the cappella audio file reaching the preliminary screening condition is accurate, that is, determine whether a singing pitch of a user corresponding to the cappella audio file reaching the preliminary screening condition reaches a usability criterion. The uploaded cappella audio file is determined as a candidate cappella audio file if it is determined that the singing pitch of the cappella audio file reaching the preliminary screening condition is accurate.

In this embodiment, the cappella audio file includes the cappella data obtained when the user sings the song. The cappella data includes voice data of the user collected when the user sings the song. The voice data includes data for indicating a tone of the voice of the user, data for indicating a timbre of the voice of the user, data for indicating loudness of the voice of the user, data for indicating a musical tone of the voice of the user, and the like. The cappella audio file may further include pitch data obtained when the user sings the song. The pitch data is used to indicate a pitch when the user sings the song, so that specific production personnel determine whether the user accurately sings the song.

Optionally, it is determined whether a cappella audio file corresponding to the song exists. An uploading request for requesting a cappella audio file to be uploaded is sent if it is determined that no cappella audio file corresponding to the song exists. Objects receiving the uploading request are screened before the uploading request is sent. Historical singing data, stored in a database, of a song sung by a user may be obtained. Level data for indicating a singing level of the user is determined based on the historical singing data. A user whose level data reaches a predetermined level threshold is determined as a target user. In an example, a cappella audio file generated when the target user sings the song is determined as a candidate cappella audio file, and then a terminal recoding the cappella audio file of the target user is an object receiving the uploading request.

When the objects receiving the uploading request are screened, evaluation data and score data of the song sung by the user may be further obtained from the database. For example, the evaluation data includes data for indicating "satisfactory", "unsatisfactory", "bad", "ordinary", "good", or "like", and the score data may be data for indicating a score from 0 to 10. The level data for indicating the singing level of the user is determined based on the evaluation data and the score data. Then the user whose level data reaches the predetermined level threshold is determined as the target user, and the cappella audio file generated when the target user sings the song is obtained.

Optionally, if a song for which a digital score file is to be generated is a new song, and no user has sung the song, a user at a high level is invited with a reward to sing the new song, to obtain a cappella audio file corresponding to the new song.

In step S204, divide the candidate cappella audio file based on time information (or timing information) of the song to obtain a plurality of valid audio segments.

In the technical solution provided in step S204 in this application, a song corresponds to a lyric file, and the lyric file includes time information (or line timing information) corresponding to each sentence (or each lyric line) of lyrics. Each sentence in the lyric file corresponds to one audio segment. Optionally, an audio segment that has a lyric and does not have excess noise is determined as a valid audio segment of the candidate cappella audio file. After the candidate cappella audio file is obtained, the candidate cappella audio file is divided to obtain a plurality of valid audio segments. Optionally, length information of each sentence in a lyric file corresponding to the candidate cappella audio file is obtained, the candidate cappella audio file is divided based on the length information of each sentence to obtain a division result, and it is detected whether a division result has excess noise, to remove a part that does not have a lyric, and ensure that a valid audio segment does not have excess noise.

In step S206, extract note information (or music note information) of each valid audio segment.

In this embodiment, the note information includes one or more triplets (or data sets), and a triplet may be extracted from a valid audio segment. Each valid audio segment may be processed. For example, filtering processing may be performed on each valid audio segment to obtain a fundamental frequency band, notation processing (or music note processing) is performed on fundamental frequency values in the fundamental frequency band to obtain note values of the fundamental frequency value, and then the note values are merged. In an example, filtering processing may be performed on each valid audio segment to obtain at least one fundamental frequency band, notation processing is performed on at least one fundamental frequency value in the at least one fundamental frequency band to obtain at least one note value associated with the at least one fundamental frequency value, and then the note values are merged. Points having same note values in the note values may be combined, and a triplet corresponding to each valid audio segment is generated. The triplet corresponding to each valid audio segment includes a start time (or an onset time) of the triplet, a note value (or a music note value) of the triplet, and a duration of the triplet. Each triplet (or each data set) includes a start time of a note (or a music note), a duration of the note, and a note value of the note in a mapping relationship. The start time of the note is the start time of the triplet, and a unit of the start time may be millisecond (ms). The duration of the note is the duration of the triplet, and a unit of the duration may be ms. The note value of the note is the note value of the triplet. After the plurality of valid audio segments is obtained by dividing the candidate cappella audio file, the note information of each valid audio segment is extracted.

In step S208, generate a digital score file based on the note information of each valid audio segment.

The digital score file includes some or all of the triplets. After the note information of each valid audio segment is extracted, the digital score file is generated based on the start time of the note, the duration of the note, and the note value of the note. Optionally, a plurality of triplets in the note information are combined into a triplet sequence (or a sequence), and the triplet sequence is normalized to obtain the digital score file. Optionally, when the triplet sequence is normalized, triplets $W_i$ corresponding to all n valid audio segments x1 may be combined. For example, a start time s of a triplet corresponding to each sentence and a start time of the sentence in the entire song are directly combined to obtain a triplet sequence $W_a = O_i$ i∈[1, t] corresponding to the entire song, where O is used to represent a triplet, i is used to represent the $i^{th}$, and t is used to represent a total quantity of triplets in this triplet sequence. When a triplet satisfies one of the following conditions (1) to (3) (i>1 and i<t), $O_i$ is processed (where $m_i$ is a note value of the $i^{th}$ triplet, $m_{i-1}$ is a note value of the $(i-1)^{th}$ triplet, and $m_{i+1}$ is a note value of the $(i+1)^{th}$ triplet):

$$|m_i - m_{i-1}| \geq 6; \qquad (1)$$

$$|m_i - m_{i+1}| \geq 6; \text{ and} \qquad (2)$$

$$|m_{i-1} - m_{i+1}| \leq 3. \qquad (3)$$

During triplet processing, when $s_i = s_{i-1} + l_{i-1}$ is true, the $(i-1)^{th}$ triplet and the $i^{th}$ triplet are merged, that is, a duration $l'_{i-1}$ of the $(i-1)^{th}$ triplet is calculated based on $l'_{i-1} = l_{i-1} + l_i$, and the $i^{th}$ triplet is deleted, where $s_i$ is a start time of the $i^{th}$ triplet, $s_{i-1}$ is a start time of the (i−1)th triplet, $l_{i-1}$ is a duration of the $(i-1)^{th}$ triplet, and $l_i$ is a duration of the $i^{th}$ triplet. When $s_i=s_{i-1}+l_{i-1}$ is untrue and $s_{i+1}=s_i+l_i$ is true, a duration $l'_{i+1}$ of the $(i+1)^{th}$ triplet is calculated based on $l'_{i+1}=l_{i+1}+l_i$, a start time $s'_{i+1}$ of the $(i+1)^{th}$ triplet is calculated based on $s'_{i+1}=s_i$, and the $i^{th}$ triplet is deleted, where $s_{i+1}$ is the start time of the $(i+1)^{th}$ triplet, and $l_{i+1}$ is a duration of the $(i+1)^{th}$ triplet. When $s_i=s_{i-1}+l_{i-1}$ is untrue and $s_{i+1}=s_i+l_i$ is untrue, the $i^{th}$ triplet is directly deleted. Therefore, the triplet sequence is normalized, and the digital score file is generated by using the normalized triplet sequence.

After the digital score file is obtained, the digital score file is output in a preset format. Optionally, quality of the digital score file is inspected. For example, a qualified digital score file is retained while an unqualified digital score file is deleted. Therefore, manual digital score file production costs are reduced, and digital score file production efficiency is improved.

Optionally, the digital score file is an MIDI file. Therefore, through the foregoing steps, manual MIDI file production costs are effectively reduced, MIDI file production quality is improved, and MIDI file production efficiency is improved.

Optionally, in this embodiment, one or more candidate cappella audio files may be obtained from the cappella audio files corresponding to the song. When a plurality of candidate cappella audio files are obtained, each candidate cappella audio file is divided based on the time information of the song to obtain a plurality of valid audio segments of each candidate cappella audio file, and a digital score file corresponding to each candidate cappella audio file is generated based on note information of the plurality of valid audio segments corresponding to each candidate cappella audio file. The digital score file corresponding to each candidate cappella audio file may be an MIDI file. Optionally, the digital score file corresponding to each candidate cappella audio file may be selected by a user, and the selected digital score file of the candidate cappella audio file is determined as a final digital score file of the song. Alternatively, quality of the digital score file corresponding to each candidate cappella audio file may be inspected to obtain a quality inspection result, and a digital score file having a highest quality inspection result is determined as a final digital score file of the song.

Through the foregoing steps S202 to step S208, a candidate cappella audio file satisfying a first condition is obtained from cappella audio files corresponding to a song; the candidate cappella audio file is divided based on time information of the song to obtain a plurality of valid audio segments; note information of each valid audio segment is extracted, the note information including one or more triplets, and each triplet including a start time of a note, a duration of the note, and a note value of the note in a mapping relationship; and a digital score file is generated based on the note information of each valid audio segment, the digital score file including some or all of the triplets. As the digital score file is generated based on the cappella data obtained when the user sings the song corresponding to the candidate cappella audio file, automatic digital score file generation is achieved, high costs of manual digital score file production are avoided, and digital score file production efficiency is improved, thereby resolving a technical problem of low digital score file production efficiency in related technologies.

In an optional implementation, the dividing the candidate cappella audio file based on time information of the song to obtain a plurality of valid audio segments in step S204 includes: dividing the candidate cappella audio file based on the time information corresponding to each sentence of lyrics in the lyric file, to obtain the plurality of valid audio segments.

Figure 3:
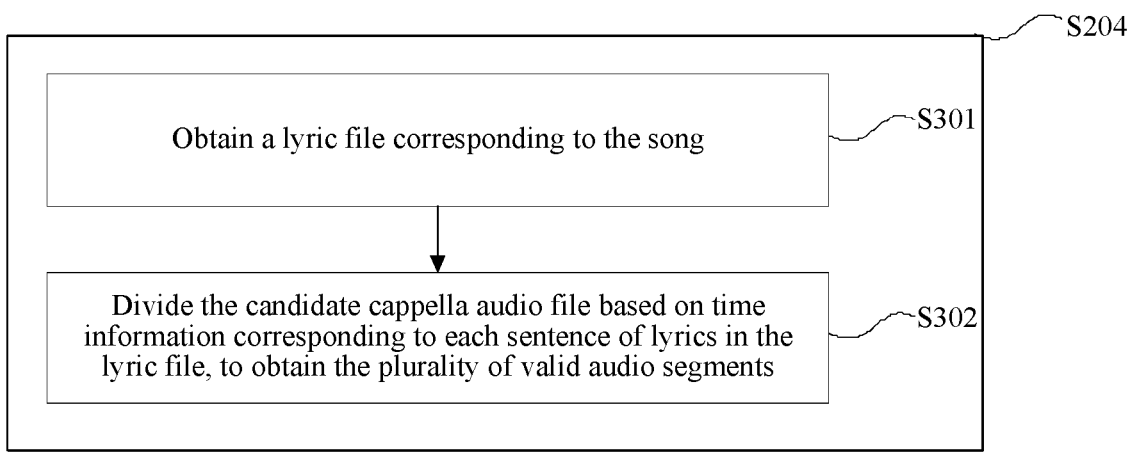
FIG. 3 is a flowchart of a method for dividing a candidate cappella audio file based on time information of a song to obtain a plurality of valid audio segments according to an embodiment of this application.

FIG. 3 is a flowchart of a method for dividing a candidate cappella audio file based on time information of a song to obtain a plurality of valid audio segments according to an embodiment of this application. As shown in FIG. 3, the method includes the following steps:

In step S301, obtain a lyric file corresponding to the song.

In this embodiment, a song corresponds to a lyric file, the lyric file corresponding to the song is obtained, and the lyric file includes time information corresponding to each sentence of lyrics.

The candidate cappella audio file includes a lyric file. A play length (or a play duration) of each audio segment in the candidate cappella audio file is obtained based on the lyric file included in the candidate cappella audio file. The lyric file includes indication information for indicating a play length, that is, the play length of each audio segment in the lyric file during playing may be determined by using the indication information.

In step S302, divide the candidate cappella audio file based on time information corresponding to each sentence of lyrics in the lyric file, to obtain the plurality of valid audio segments.

Specifically, the time information corresponding to each sentence of lyrics is the play length of each audio segment in the candidate cappella audio file. After the lyric file corresponding to the song is obtained, the plurality of audio segments in the candidate cappella audio file are determined based on the time information corresponding to each sentence of lyrics in the lyric file. Each audio segment corresponds to each sentence of lyrics in the lyric file. For example, in the lyric file, time information corresponding to a first sentence of lyrics is 1 to 8 seconds, time information corresponding to a second sentence of lyrics is 1 to 10 seconds, and time information corresponding to a third sentence of lyrics is 1 to 6 seconds. Then a first audio segment is divided from the candidate cappella audio file based on 1 to 8 seconds, and the first audio segment corresponds to the first sentence of lyrics; a second audio segment is divided from the candidate cappella audio file based on 1 to 10 seconds, and the second audio segment corresponds to the second sentence of lyrics; a third audio segment t is divided from the candidate cappella audio file based on 1 to 6 seconds, and the third audio segment corresponds to the third sentence of lyrics.

Optionally, original audio data in the candidate cappella audio file is obtained, the original audio data is divided based on the time information corresponding to each sentence of lyrics to obtain a plurality of audio segments, and from all the audio segments, a part that does not have a lyric is removed, and a part that has excess noise is removed. Therefore, a plurality of valid audio segments are extracted from the plurality of audio segments, thereby achieving the objective of dividing the candidate cappella audio file based on time information corresponding to each sentence of lyrics in the lyric file, to obtain the plurality of valid audio segments.

In this embodiment, a lyric file corresponding to a song is obtained, and a candidate cappella audio file is divided based on time information corresponding to each sentence of lyrics in the lyric file, to obtain a plurality of valid audio segments, thereby achieving the objective of dividing the candidate cappella audio file based on time information of the song to obtain a plurality of valid audio segments, and improving digital score file production efficiency.

In an optional implementation, the extracting note information of each valid audio segment in step S206 includes: processing each valid audio segment to obtain a fundamental frequency band when a sum of play lengths of audio segments having a non-zero fundamental frequency value in the plurality of valid audio segments exceeds a preset time, and merging note values obtained by performing notation processing on fundamental frequency values in the fundamental frequency band, to obtain note information of the valid audio segments.

Figure 4:
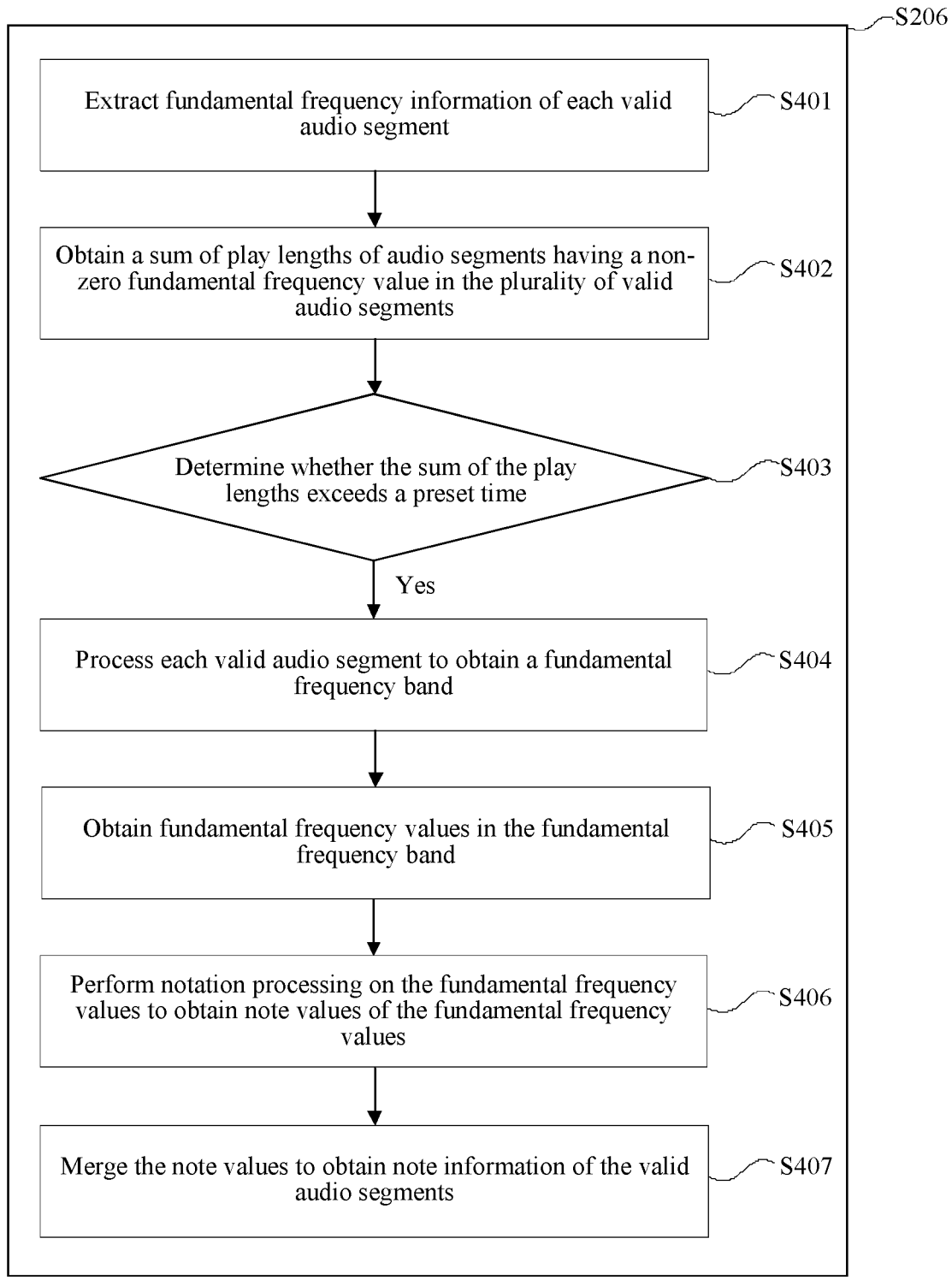
FIG. 4 is a flowchart of a method for extracting note information of each valid audio segment according to an embodiment of this application.

FIG. 4 is a flowchart of a method for extracting note information of each valid audio segment according to an embodiment of this application. As shown in FIG. 4, the method includes the following steps:

In step S401, extract fundamental frequency information of each valid audio segment.

The fundamental frequency information includes a fundamental frequency value of the audio segment. After the plurality of valid audio segments is divided from the candidate cappella audio file, the fundamental frequency information of each valid audio segment is extracted. The fundamental frequency information may be a fundamental frequency with a frame shift of 10 ms and a frame length of 30 ms. The fundamental frequency information includes a fundamental frequency value of the audio segment. When people utter sounds, a large number of overtones are produced after frequencies produced by vocal fold vibration are filtered by the vocal tract. Therefore, to facilitate subsequent processing of the candidate cappella audio file, a fundamental tone directly indicating a vocal fold vibration frequency needs to be extracted from audio information. The fundamental tone also decides a pitch, that is, a fundamental frequency value, of an entire note.

In step S402, obtain a sum of play lengths of audio segments having a non-zero fundamental frequency value in the plurality of valid audio segments.

After the fundamental frequency information of each valid audio segment is extracted, the fundamental frequency value of each valid audio segment is obtained, and then audio segments having a non-zero audio value are extracted from the plurality of valid audio segments. For example, the plurality of valid audio segments include an audio segment 1, an audio segment 2, an audio segment 3, and an audio segment 4, the audio segment 1 and the audio segment 2 are audio segments having non-zero fundamental frequency values, and the audio segment 3 and the audio segment 4 are audio segments having zero fundamental frequency values. Then the audio segment 1 and the audio segment 2 are extracted from the audio segment 1, the audio segment 2, the audio segment 3, and the audio segment 4. After the audio segments having non-zero fundamental frequency values are extracted from the plurality of audio segments, play lengths of the audio segments having a non-zero fundamental frequency value are obtained, and the play lengths of the audio segments having a non-zero fundamental frequency value are added up to obtain a sum of the play lengths of the audio segments having a non-zero fundamental frequency value. For example, after the audio segment 1 and the audio segment 2 are extracted from the audio segment 1, the audio segment 2, the audio segment 3, and the audio segment 4, play lengths of the audio segment 1 and the audio segment 2 are separately obtained. For example, the audio segment 1 has a play length of 2 seconds, and the audio segment 2 has a play length of 3 seconds. Then the play length 2 seconds of the audio segment 1 and the play length 3 seconds of the audio segment 2 are added up to obtain a sum 5 seconds of the play lengths of the audio segments having a non-zero fundamental frequency value.

Optionally, when the audio segments having a non-zero fundamental frequency value are obtained from the plurality of valid audio segments, fundamental frequency values of adjacent valid audio segments in the plurality of valid audio segments may be obtained. When a difference between the fundamental frequency values of the adjacent valid audio segments satisfies a specific condition, for example, if the difference between the fundamental frequency values of the adjacent valid audio segments is less than a predetermined difference, the fundamental frequency values of the adjacent valid audio segments are set to zero. That is, a singular fundamental frequency is detected based on a difference between fundamental frequency values of two adjacent fundamental frequencies in the valid audio segments, and the singular fundamental frequency is set to zero, so that the adjacent valid audio segments are audio segments having a zero fundamental frequency value.

In step S403, determine whether the sum of the play lengths exceeds a preset time (or a preset duration).

After the sum of the play lengths of the valid audio segments having a non-zero fundamental frequency value in the plurality of valid audio segments is obtained, it is determined whether the sum of the play lengths exceeds the preset time. The preset time may be 10 seconds. It is determined whether the sum of the play lengths of the valid audio segments having a non-zero fundamental frequency value exceeds 10 seconds.

After it is determined whether the sum of the play lengths exceeds the preset time, if it is determined that the sum of the play lengths does not exceed the preset time, that is, the sum of the play lengths of the audio segments having a non-zero fundamental frequency value is relatively short, it is determined that the valid audio segments do not satisfy the condition, and cannot be used to obtain a fundamental frequency band. Alternatively, fundamental frequency information of each valid audio segment is re-extracted, a sum of play lengths of audio segments having a non-zero fundamental frequency value in the plurality of valid audio segments is re-obtained, and it is re-determined whether the sum of the play lengths exceeds the preset time. If the sum of the play lengths still does not exceed the preset time, it is directly determined that the valid audio segments do not satisfy the condition, and cannot be used to obtain a fundamental frequency band. Alternatively, the valid audio segments are not processed.

In step S404, process each valid audio segment to obtain a fundamental frequency band.

After it is determined whether the sum of the play lengths exceeds the preset time, if it is determined that the sum of the play lengths exceeds the preset time, each valid audio segment is processed to obtain the fundamental frequency band, that is, the plurality of valid audio segments are separately processed to obtain the fundamental frequency band. Optionally, filtering processing is performed on each valid audio segment to obtain the fundamental frequency band. When the sum of the play lengths exceeds the preset time, each valid audio segment is processed, so that the fundamental frequency band is obtained, and because the sum of the play lengths is relatively long, notation processing may be performed on fundamental frequency values in the fundamental frequency band to obtain note values of the fundamental frequency values, and a triplet including a start time, a note value, and a duration may be divided well. Therefore, the note information of each valid audio segment can be accurately obtained, achieving the objective of extracting note information of each valid audio segment to generate a digital score file based on the note information of each valid audio segment, and improving digital score file production efficiency.

In step S405, obtain fundamental frequency values in the fundamental frequency band.

After the fundamental frequency band is obtained by processing the valid audio segments, the fundamental frequency values in the fundamental frequency band are obtained. Optionally, a value of a zero fundamental frequency band less than a preset frame quantity in the fundamental frequency band is set to a fundamental frequency value of the last frame of the fundamental frequency band. For example, fundamental frequency values of zero fundamental frequency bands less than 15 frames in the fundamental frequency band are all set to the fundamental frequency value of the last frame of the fundamental frequency band.

In step S406, perform notation processing on the fundamental frequency values to obtain note values of the fundamental frequency values.

After the fundamental frequency values in the fundamental frequency band are obtained, notation processing is performed on the fundamental frequency values. For example, note values f(x) of the fundamental frequency values are calculated based on a formula $$f(x) = (\text{int})\left(12 * \log_2 \frac{x}{440} + 69.5\right),$$

where x is a fundamental frequency value in the fundamental frequency band. Optionally, all fundamental frequency values in the fundamental frequency band are notated to obtain note values.

In step S407, merge the note values to obtain note information of the valid audio segments.

After the note values of the fundamental frequency values are obtained by performing notation processing on the fundamental frequency values, the note values are merged. Points having same note values are combined, so that a triplet sequence $W=O_i$, $i \in [1, k]$ is obtained, where 0 is a triplet (s, m, l), s is a start time (in unit of ms) of the triplet, m is a note value of the triplet, l is a duration (in unit of ms) of the triplet, and k is a quantity of triplets included in the triplet sequence. Therefore, the note information of the valid audio segments is obtained.

In this embodiment, fundamental frequency information of each valid audio segment is extracted, where the fundamental frequency information includes a fundamental frequency value of the audio segment; a sum of play lengths of audio segments having a non-zero fundamental frequency value in the plurality of valid audio segments is obtained; each valid audio segment is processed to obtain a fundamental frequency band if the sum of the play lengths exceeds a preset time; fundamental frequency values in the fundamental frequency band are obtained; notation processing is performed on the fundamental frequency values to obtain note values of the fundamental frequency values; and the note values are merged to obtain note information of the valid audio segment, thereby achieving the objective of extracting note information of each valid audio segment, and improving digital score file production efficiency.

In an optional implementation, the processing each valid audio segment in step S404 includes: performing filtering processing on the audio segment based on a length corresponding to the audio segment to obtain a filtered segment, and obtaining a fundamental frequency value of the filtered segment.

Figure 5:
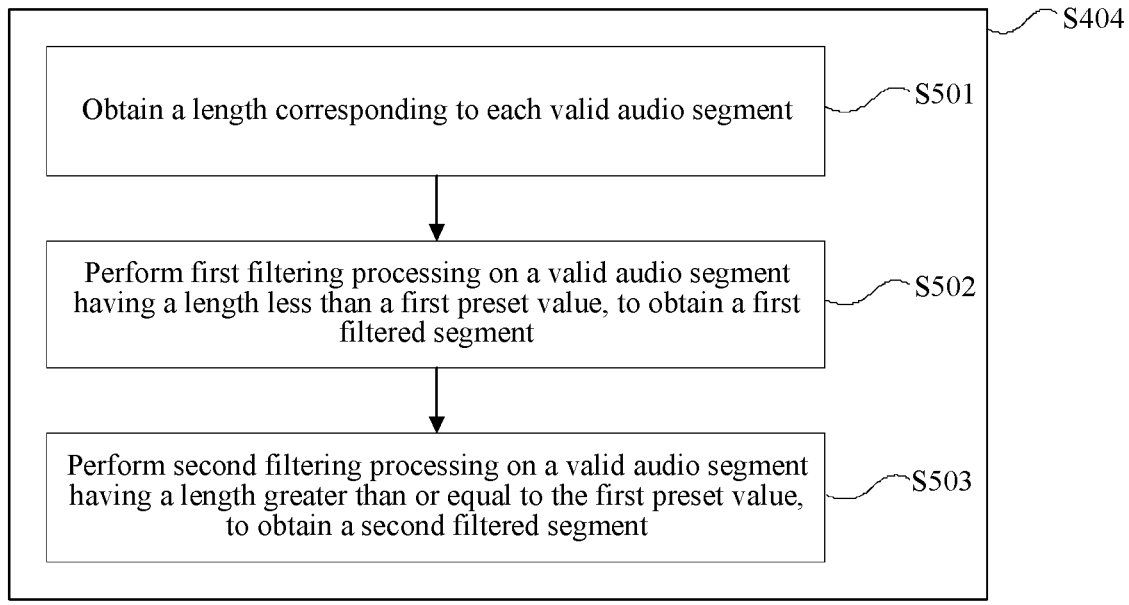
FIG. 5 is a flowchart of a method for processing each valid audio segment according to an embodiment of this application.

FIG. 5 is a flowchart of a method for processing each valid audio segment according to an embodiment of this application. As shown in FIG. 5, the method includes the following steps:

In step S501, obtain a length corresponding to each valid audio segment.

The length corresponding to the audio segment in this embodiment is a fundamental frequency band length, in unit of frame. If it is determined that the sum of the play lengths exceeds the preset time, the length corresponding to each valid audio segment is obtained.

In step S502, perform first filtering processing on a valid audio segment having a length less than a first preset value, to obtain a first filtered segment.

After the length corresponding to each valid audio segment is obtained, it is determined whether the length corresponding to each valid audio segment is less than the first preset value. The first filtering processing is performed on the valid audio segment having a length less than the first preset value, to obtain the first filtered segment. For example, the first preset value is 35 frames, and for a valid audio segment having a fundamental frequency band length less than 35 frames, median filtering whose window length is the fundamental frequency band length is directly performed to obtain a first filtered segment.

In step S503, perform second filtering processing on a valid audio segment having a length greater than or equal to the first preset value, to obtain a second filtered segment.

After the length corresponding to each valid audio segment is obtained, it is determined whether the length corresponding to each valid audio segment is less than the first preset value. The second filtering processing is performed on the valid audio segment having a length greater than or equal to the first preset value, to obtain the second filtered segment. For example, the first preset value is 35 frames, and for a valid audio segment having a fundamental frequency band length greater than or equal to 35 frames, 10-point median filtering is performed on each frame to obtain a second filtered segment.

In this embodiment, median filtering is used to filter out a noise signal from the valid audio segment, and when the noise signal is filtered out, a signal edge of the valid audio segment can be protected from blurring. When median filtering is performed on the valid audio segment, a window length is set, various pieces of data of the audio segment within the window length are set as signal sample values of the median filtering, the signal sample values are sequenced in ascending order, and a median of the sequenced data is an output value of the median filtering.

For example, when 10-point median filtering is performed for the valid audio segment having a fundamental frequency band length greater than or equal to 35 frames, a window length is set to 10 points, that is, median filtering is performed on 10 pieces of data in each frame of audio segment in the valid audio segment having a length greater than or equal to the first preset value, the 10 pieces of data within the window length are set as signal sample values of the median filtering, the signal sample values are sequenced in ascending order, and a median of the sequenced data is an output value of the median filtering. Therefore, the second filtered segment is obtained.

Optionally, the obtaining fundamental frequency values in the fundamental frequency band includes: obtaining a fundamental frequency value of the first filtered segment and a fundamental frequency value of the second filtered segment.

In this embodiment, a length corresponding to each valid audio segment is obtained; first filtering processing is performed on an audio segment having a length less than a first preset value, to obtain a first filtered segment; second filtering processing is performed on an audio segment having a length greater than or equal to the first preset value, to obtain a second filtered segment, thereby achieving the objective of processing each valid audio segment, and improving digital score file production efficiency.

In an optional implementation, after the length corresponding to each valid audio segment is obtained, a zero audio segment exists in valid audio segments having a length less than a second preset value, and a fundamental frequency value of the zero audio segment is set as a preset fundamental frequency value.

Figure 6:
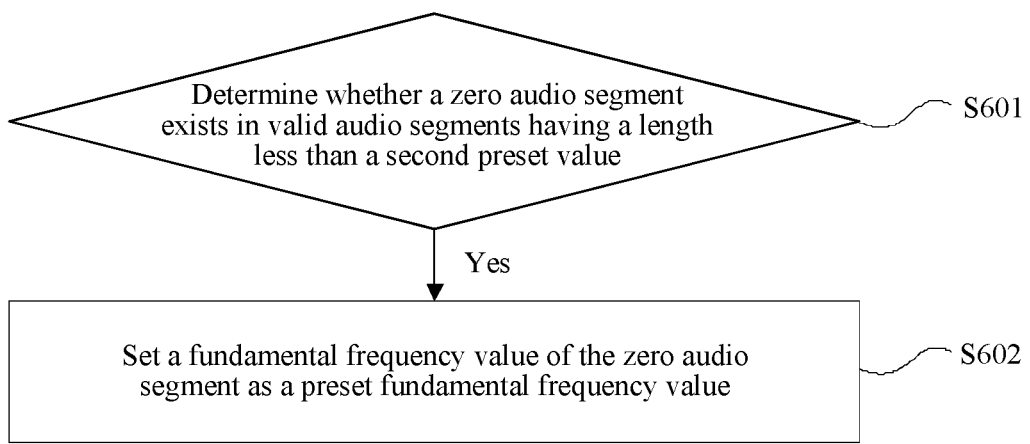
FIG. 6 is a flowchart of another method for generating a digital score file of a song according to an embodiment of this application.

FIG. 6 is a flowchart of another method for generating a digital score file of a song according to an embodiment of this application. As shown in FIG. 6, the method further includes the following steps:

In step S601, determine whether a zero audio segment exists in valid audio segments having a length less than a second preset value.

After the length corresponding to each valid audio segment is obtained, it is determined whether the zero audio segment exists in the valid audio segments having a length less than the second preset value, where the zero audio segment is an audio segment having a zero fundamental frequency value.

The zero audio segment is an audio segment having a zero fundamental frequency value. The second preset value may be 15 frames. It is determined whether the zero audio segment exists in audio segments having a length less than 15 frames.

In step S602, set a fundamental frequency value of the zero audio segment as a preset fundamental frequency value.

After it is determined whether the zero audio segment exists in the valid audio segments having a length less than the second preset value, if it is determined that the zero audio segment exists in the valid audio segments having a length less than the second preset value, the fundamental frequency value of the zero audio segment is set as the preset fundamental frequency value. Optionally, the preset fundamental frequency value is a fundamental frequency value of the last frame of a fundamental frequency band, and fundamental frequency values of zero fundamental frequency bands less than 15 frames in the fundamental frequency band may be all set to the fundamental frequency value of the last frame of the fundamental frequency band.

Optionally, the obtaining fundamental frequency values in the fundamental frequency band includes: obtaining the fundamental frequency value of the first filtered segment, the fundamental frequency value of the second filtered segment, and the preset fundamental frequency value.

In this embodiment, after a length corresponding to each valid audio segment is obtained, it is determined whether a zero audio segment exists in valid audio segments having a length less than a second preset value, where the zero audio segment is an audio segment having a zero fundamental frequency value; a fundamental frequency value of the zero audio segment is set as a preset fundamental frequency value when it is determined that the zero audio segment exists in the valid audio segments having a length less than the second preset value; and a fundamental frequency value of a first filtered segment, a fundamental frequency value of a second filtered segment, and the preset fundamental frequency value are obtained, thereby achieving the objective of processing each valid audio segment, and improving digital score file production efficiency.

In an optional implementation, before the sum of the play lengths of the audio segments having a non-zero fundamental frequency value in the plurality of valid audio segments is obtained, fundamental frequency values of adjacent audio segments are set to zero when a difference between the fundamental frequency values of the adjacent audio segments satisfies a second condition.

Figure 7:
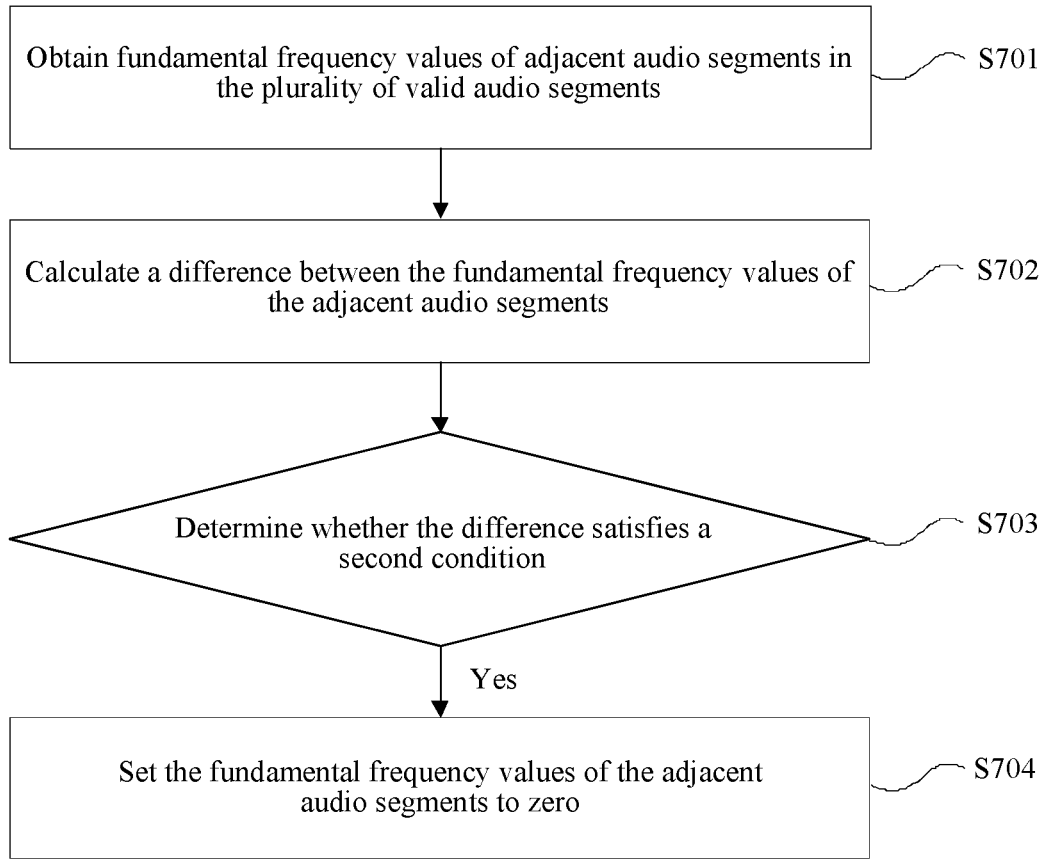
FIG. 7 is a flowchart of another method for generating a digital score file of a song according to an embodiment of this application.

FIG. 7 is a flowchart of another method for generating a digital score file of a song according to an embodiment of this application. As shown in FIG. 7, the method further includes the following steps:

In step S701, obtain fundamental frequency values of adjacent audio segments in the plurality of valid audio segments.

Before the sum of the play lengths of the audio segments having a non-zero fundamental frequency value in the plurality of valid audio segments is obtained, the fundamental frequency values of the adjacent audio segments in the plurality of valid audio segments are obtained.

In step S702, calculate a difference between the fundamental frequency values of the adjacent audio segments.

After the fundamental frequency values of the adjacent audio segments in the plurality of valid audio segments are obtained, the difference between the fundamental frequency values of the adjacent audio segments is obtained through calculation based on the fundamental frequency values of the adjacent audio segments.

In step S703, determine whether the difference satisfies a second condition.

After the difference between the fundamental frequency values of the adjacent audio segments is calculated, it is determined whether the difference satisfies the second condition. The second condition may be a condition that the difference is less than a predetermined difference, which is a condition for detecting a singular fundamental frequency. The singular fundamental frequency is detected based on fundamental frequency values of two adjacent fundamental frequencies.

In step S704, set the fundamental frequency values of the adjacent audio segments to zero.

If it is determined that the difference satisfies the second condition, a singular fundamental frequency is determined based on the difference between the fundamental frequency values of the two adjacent fundamental frequencies, and the fundamental frequency values of the adjacent audio segments are set to zero.

In this embodiment, before the sum of the play lengths of the audio segments having a non-zero fundamental frequency value in the plurality of valid audio segments is obtained, fundamental frequency values of adjacent audio segments in the plurality of valid audio segments are obtained; a difference between the fundamental frequency values of the adjacent audio segments is calculated; it is determined whether the difference satisfies a second condition; and the fundamental frequency values of the adjacent audio segments are set to zero if it is determined that the difference satisfies the second condition, thereby achieving the operation of zero setting processing on the audio segments, and improving digital score file production efficiency.

In an optional implementation, the merging the note values to obtain note information of the valid audio segments in step S407 includes: generating triplets corresponding to the plurality of valid audio segments based on same note values in the note values, and combining the triplets corresponding to the plurality of valid audio segments into a first triplet sequence (or a first sequence) for indicating the note information.

Figure 8:
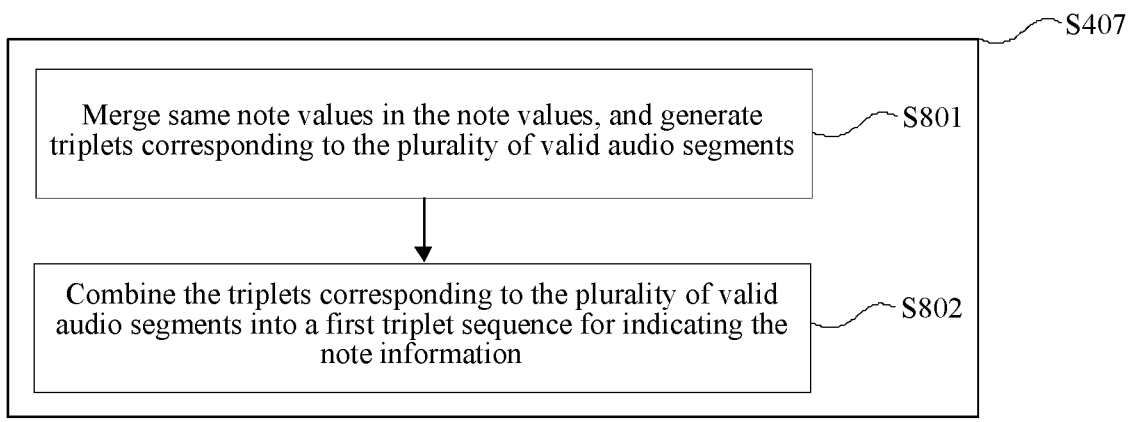
FIG. 8 is a flowchart of a method for merging note values according to an embodiment of this application.

FIG. 8 is a flowchart of a method for merging note values according to an embodiment of this application. As shown in FIG. 8, the method includes the following steps:

In step S801, merge same note values in the note values, and generate triplets corresponding to the plurality of valid audio segments.

The same note values in the note values are obtained, points having same note values in the note values are combined, and the triplets corresponding to the plurality of valid audio segments are generated. The triplets corresponding to the plurality of valid audio segments include start times of the triplets, note values of the triplets, and durations of the triplets.

In step S802, combine the triplets corresponding to the plurality of valid audio segments into a first triplet sequence for indicating the note information.

After the same note values in the note values are merged, and the triplets corresponding to the plurality of valid audio segments are generated, the triplets corresponding to the plurality of valid audio segments are combined into the first triplet sequence for indicating the note information.

In this embodiment, same note values in the note values are merged, and triplets corresponding to the plurality of valid audio segments are generated; and the triplets corresponding to the plurality of valid audio segments are combined into a first triplet sequence for indicating the note information, thereby achieving the objective of merging the note values to obtain note information of the valid audio segments.

In an optional implementation, the generating triplets corresponding to the plurality of valid audio segments in step S801 includes: generating the triplets corresponding to the plurality of valid audio segments based on the same note values, the start times of the triplets corresponding to the plurality of valid audio segments, and the durations of the triplets corresponding to the plurality of valid audio segments.

Figure 9:
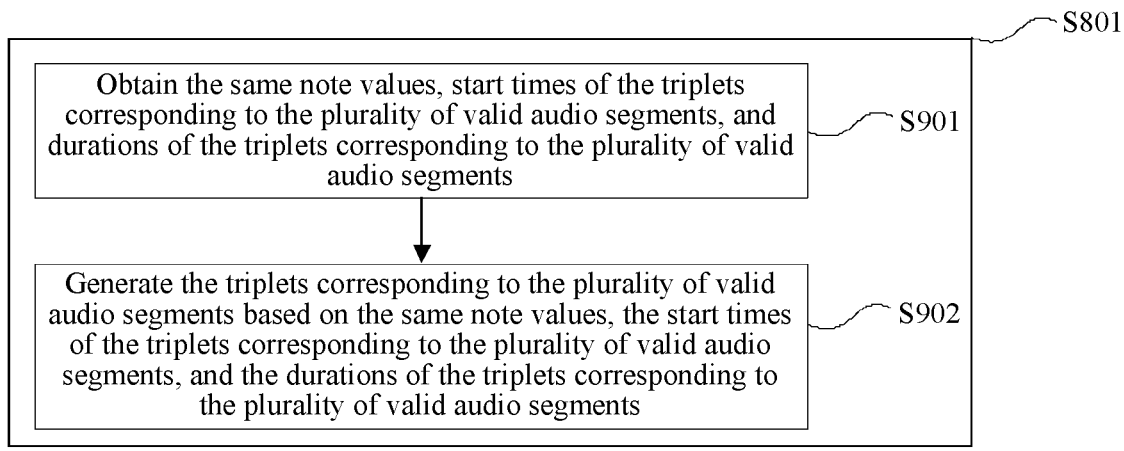
FIG. 9 is a flowchart of a method for generating triplets corresponding to a plurality of valid audio segments according to an embodiment of this application.

FIG. 9 is a flowchart of a method for generating triplets corresponding to a plurality of valid audio segments according to an embodiment of this application. As shown in FIG. 9, the method includes the following steps:

In step S901, obtain the same note values, start times of the triplets corresponding to the plurality of valid audio segments, and durations of the triplets corresponding to the plurality of valid audio segments.

In this embodiment, when the triplets corresponding to the plurality of valid audio segments are generated, the same note values, the start times of the triplets corresponding to the plurality of valid audio segments, and the durations of the triplets corresponding to the plurality of valid audio segments are obtained.

In step S902, generate the triplets corresponding to the plurality of valid audio segments based on the same note values, the start times of the triplets corresponding to the plurality of valid audio segments, and the durations of the triplets corresponding to the plurality of valid audio segments.

After the same note values, the start times of the triplets corresponding to the plurality of valid audio segments, and the durations of the triplets corresponding to the plurality of valid audio segments are obtained, the triplets corresponding to the plurality of valid audio segments are generated based on the same note values, the start times of the triplets corresponding to the plurality of valid audio segments, and the durations of the triplets corresponding to the plurality of valid audio segments.

In this embodiment, the same note values, start times of the triplets corresponding to the plurality of valid audio segments, and durations of the triplets corresponding to the plurality of valid audio segments are obtained; and the triplets corresponding to the plurality of valid audio segments are generated based on the same note values, the start times of the triplets corresponding to the plurality of valid audio segments, and the durations of the triplets corresponding to the plurality of valid audio segments, thereby achieving the objective of generating the triplets corresponding to the plurality of valid audio segments, and improving digital score file production efficiency.

In an optional implementation, the first triplet sequence includes a first triplet and a second triplet, and the generating a digital score file based on the note information of each valid audio segment in step S208 includes: obtaining a second triplet sequence (or a second sequence) in different conditions, and outputting triplets in the second triplet sequence in a preset format to obtain the digital score file.

Figure 10:
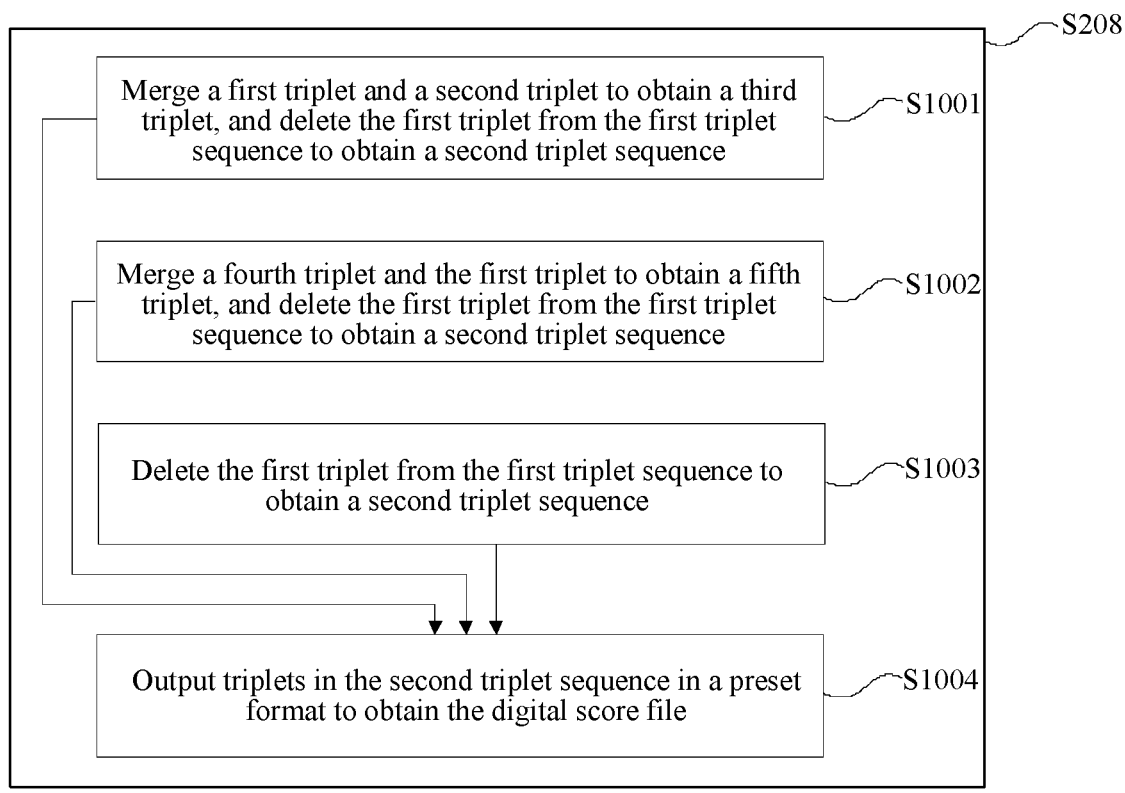
FIG. 10 is a flowchart of a method for generating a digital score file based on note information of each valid audio segment according to an embodiment of this application.

FIG. 10 is a flowchart of a method for generating a digital score file based on note information of each valid audio segment according to an embodiment of this application. As shown in FIG. 10, the method includes the following steps:

In step S1001, merge a first triplet and a second triplet to obtain a third triplet, and delete the first triplet from the first triplet sequence to obtain a second triplet sequence.

A start time of the first triplet, a start time of the second triplet, and a duration of the second triplet are obtained. When the start time of the first triplet is equal to a sum of the start time of the second triplet and the duration of the second triplet, the first triplet and the second triplet are merged to obtain the third triplet, and the first triplet is deleted from the first triplet sequence to obtain the second triplet sequence.

In step S1002, merge a fourth triplet and the first triplet to obtain a fifth triplet, and delete the first triplet from the first triplet sequence to obtain a second triplet sequence.

A start time of the fourth triplet is obtained. When the start time of the first triplet is not equal to the sum of the start time of the second triplet and the duration of the second triplet and when the start time of the fourth triplet is equal to a sum of the start time of the first triplet and a duration of the first triplet, the fourth triplet and the first triplet are merged to obtain the fifth triplet, and the first triplet is deleted from the first triplet sequence to obtain the second triplet sequence.

In step S1003, delete the first triplet from the first triplet sequence to obtain a second triplet sequence.

When the start time of the first triplet is not equal to the sum of the start time of the second triplet and the duration of the second triplet and when the start time of the fourth triplet is not equal to the sum of the start time of the first triplet and the duration of the first triplet, the first triplet is deleted from the first triplet sequence to obtain the second triplet sequence.

In step S1004, output triplets in the second triplet sequence in a preset format to obtain the digital score file.

After the second triplet sequence is obtained in different conditions of step S1001, step S1002, and step S1003, the triplets in the second triplet sequence are output in the preset format to obtain the digital score file.

In an optional implementation, when $s_i = s_{i-1} + l_{i-1}$ is true, a duration $l'_{i-1}$ of the third triplet is calculated based on $l'_{i-1} = l_{i-1} + l_i$, where $s_i$ is the start time of the first triplet, $s_{i-1}$ is the start time of the second triplet, $l_{i-1}$ is the duration of the second triplet, and $l_1$ is the duration of the first triplet.

When $s_i=s_{i-1}+l_{i-1}$ is untrue and $s_{i+1}=s_i+l_i$ is true, a duration $l'_{i+1}$ of the fifth triplet is calculated based on $l'_{i+1}=l_{i+1}+l_i$, and a start time $s'_{i+1}$ of the fifth triplet is calculated based on $s'_{i+1}=s_i$, where $s_{i+1}$ is the start time of the fourth triplet, and $l_{i+1}$ is a duration of the fourth triplet.

In an optional implementation, the obtaining a candidate cappella audio file from cappella audio files corresponding to a song in step S202 includes: obtaining reply information of a plurality of original cappella audio files, and determining an original cappella audio file as the candidate cappella audio file when a quality level indicated in the reply information reaches a predetermined level.

Figure 11:
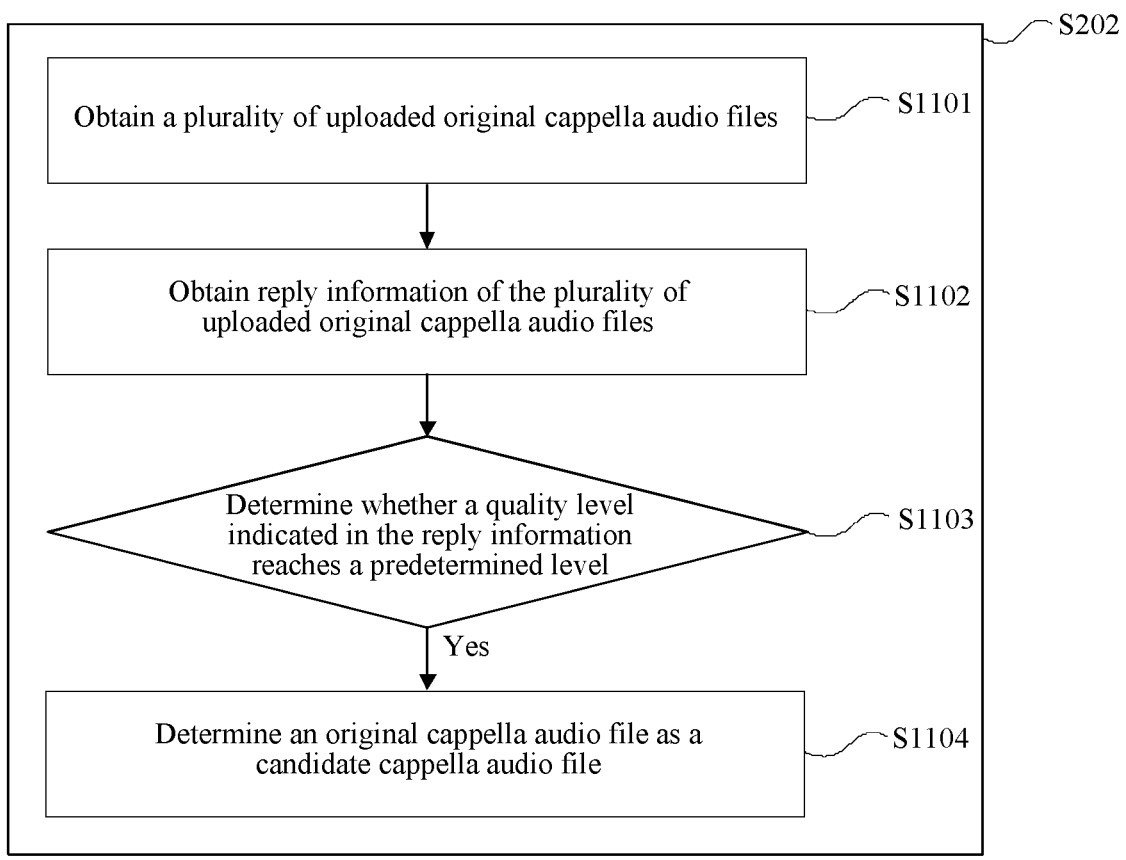
FIG. 11 is a flowchart of a method for obtaining a candidate cappella audio file according to an embodiment of this application.

FIG. 11 is a flowchart of a method for obtaining a candidate cappella audio file according to an embodiment of this application. As shown in FIG. 11, the method for obtaining a candidate cappella audio file includes the following steps:

In step S1101, obtain a plurality of uploaded original cappella audio files.

An original cappella audio file may be an uploaded cappella audio file obtained when a user sings a song. The plurality of uploaded original cappella audio files is obtained.

In step S1102, obtain reply information of the plurality of uploaded original cappella audio files.

After the plurality of uploaded original cappella audio files is obtained, the reply information of the plurality of original cappella audio files is obtained. The reply information is used to indicate a quality level of each of the original cappella audio files, which may be a score and/or an evaluation made by another user after the user sing and uploads the song. The quality level is determined based on the score and/or the evaluation.

In step S1103, determine whether a quality level indicated in the reply information reaches a predetermined level.

After the reply information of the plurality of original cappella audio files is obtained, it is determined whether the quality level indicated in the reply information reaches the predetermined level.

In step S1104, determine an original cappella audio file as a candidate cappella audio file.

The original cappella audio file is determined as the candidate cappella audio file if it is determined that the quality level indicated in the reply information reaches the predetermined level. Optionally, the original cappella audio file is not determined as the candidate cappella audio file if it is determined that the quality level indicated in the reply information does not reach the predetermined level.

Optionally, when user evaluations reach a specific threshold, for example, when at least 32 "like" are obtained, it is considered that the song sung by the user reaches a candidate criterion, the original cappella audio file is determined as a candidate cappella audio file.

In this embodiment, a plurality of uploaded original cappella audio files are obtained; reply information of the plurality of original cappella audio files is obtained, where the reply information is used to indicate a quality level of each of the original cappella audio files; it is determined whether a quality level indicated in the reply information reaches a predetermined level; and the original cappella audio file is determined as a candidate cappella audio file if it is determined that the quality level indicated in the reply information reaches the predetermined level, thereby achieving the objective of obtaining a candidate cappella audio file.

In an optional implementation, the determining an original cappella audio file as a candidate cappella audio file includes: obtaining pitch data of the original cappella audio file when determining that an evaluation index conforms to a preset evaluation index; determining whether the pitch data conforms to a preset pitch; and determining the original cappella audio file as a candidate cappella audio file if determining that the pitch data conforms to the preset pitch. Therefore, the candidate cappella audio file is obtained.

Optionally, after the candidate cappella audio file is obtained, a format of the candidate cappella audio file is adjusted to a preset format. For example, the format of the candidate cappella audio file is adjusted to a format of 16k16 bit pcm, to obtain an adjusted cappella audio file. The adjusted cappella audio file is divided based on the time information of the song to obtain a plurality of valid audio segments. Note information of each valid audio segment is extracted. A digital score file is generated based on the note information of each valid audio segment. Therefore, automatic digital score file generation is achieved.

In this embodiment, a candidate cappella audio file is obtained, the candidate cappella audio file including cappella data obtained when a user sings a song corresponding to the candidate cappella audio file; the candidate cappella audio file is divided to obtain a plurality of valid audio segments; note information of each valid audio segment is extracted, the note information including one or more triplets, and each triplet including a start time of a note, a duration of the note, and a note value of the note in a mapping relationship; and a digital score file is generated based on the note information of each valid audio segment, the digital score file including some or all of the triplets. As the digital score file is generated based on the cappella data obtained when the user sings the song corresponding to the candidate cappella audio file, automatic digital score file generation is achieved, and digital score file production efficiency is improved, thereby resolving a technical problem of low digital score file production efficiency in related technologies.

The following describes the technical solution of this application by using an exemplary embodiment.

Figures 12, 13:
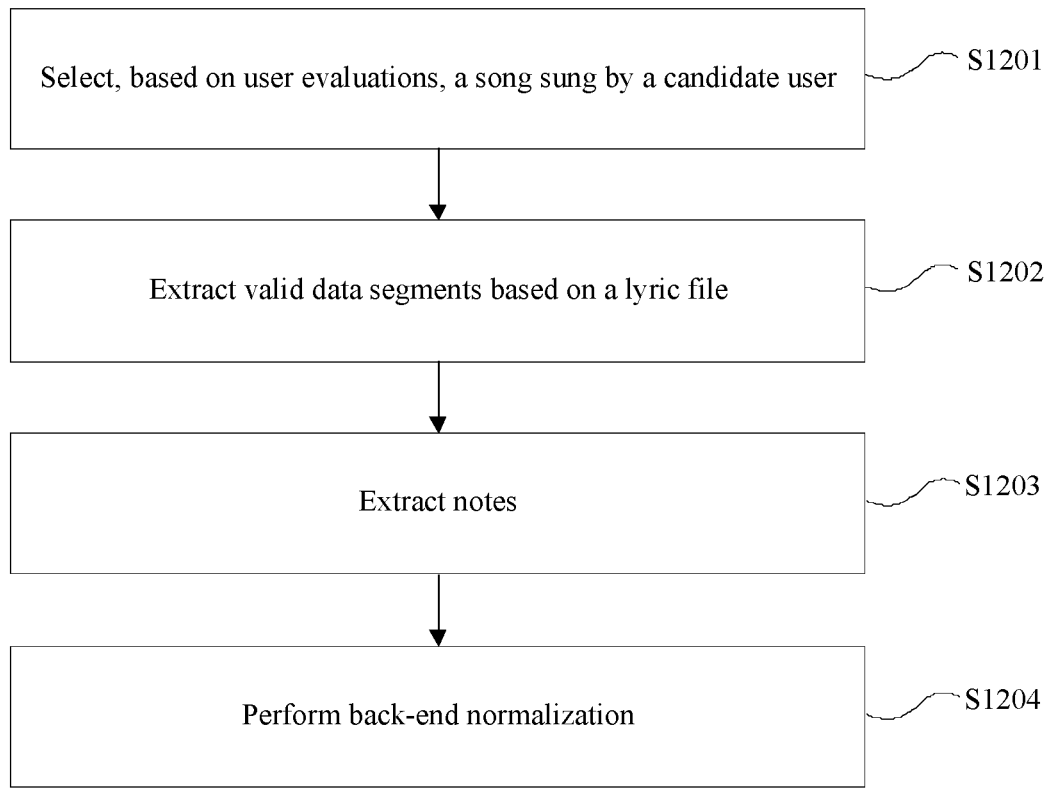
FIG. 12 is a flowchart of another method for generating a digital score file of a song according to an embodiment of this application.
FIG. 13 is a schematic diagram of a visual format of a digital score file generated based on note information of each valid audio segment according to an embodiment of this application.

FIG. 12 is a flowchart of another method for generating a digital score file of a song according to an embodiment of this application. As shown in FIG. 12, the method includes the following steps:

In step S1201, select, based on user evaluations, a song sung by a candidate user.

After a cappella audio file of the song sung by the user is uploaded, many other users score and/or evaluate the uploaded cappella audio file. When scores and/or evaluations reach a specific threshold y, it is considered that the song sung by the user reaches a candidate criterion. Then production personnel arrange an audition, to determine whether a singing pitch of the user reaches a usability criterion. Step S1202 is performed if the usability criterion is reached.

Optionally, if a song for which a cappella audio file is to be obtained is a new song, and no user has sung the song, a senior user at a high level is invited with a reward to sing the song, to obtain a cappella audio file.

In step S1202, extract valid data segments based on a lyric file.

The lyric file of the song includes length information of each sentence of the song. Original audio data is divided by using the time information in accordance with a time of each sentence, a part that does not have a lyric is removed, and it is ensured that a valid part does not have excess noise. In this way, a series of audio segments $\{x_1, x_2 \ldots x_n\}$ are obtained, where n is a quantity of sentences in the lyric file. In step S1203, extract notes.

The cappella audio file uploaded by the user is adjusted to a format of 16k16 bit pcm. Fundamental frequency information (a frame shift of 10 ms and a frame length of 30 ms) of the audio is extracted. When people utter sounds, a large number of overtones are produced after frequencies produced by vocal fold vibration are filtered by the vocal tract. Therefore, to facilitate subsequent processing, a fundamental tone directly indicating a vocal fold vibration frequency needs to be extracted from the audio. The fundamental tone also decides a pitch of an entire note. A singular fundamental frequency is detected based on a difference between fundamental frequency values of two adjacent fundamental frequencies, and is set to zero. It is determined whether a time sum of a paragraph having a non-zero fundamental frequency value exceeds 10 seconds, and a case of less than 10 seconds is directly determined as not satisfying the condition. When the time sum of the paragraph having a non-zero fundamental frequency value exceeds 10 seconds, for a valid audio segment having a length less than 35 frames, median filtering whose window length is a fundamental frequency band length is directly performed to obtain a fundamental frequency band. For a valid audio segment having a length greater than or equal to 35 frames, 10-point median filtering is performed on each frame to obtain a fundamental frequency band. Fundamental frequency values of zero fundamental frequency bands less than 15 frames in the fundamental frequency band are all set to a fundamental frequency value of the last frame of the fundamental frequency band, thereby implementing zero fundamental frequency filling.

After fundamental frequency values in the fundamental frequency band are obtained, notation processing is performed on the fundamental frequency values. For example, note values f(x) of the fundamental frequency values are calculated based on a formula $$f(x) = (\text{int})\left(12 * \log_2 \frac{x}{440} + 69.5\right),$$

where x is a fundamental frequency value in the fundamental frequency band. Optionally, notation processing is performed on all fundamental frequency values in the fundamental frequency band to obtain note values.

The obtained note values are merged. Points having same note values are combined, so that a triplet sequence $W=O_i i$, $i \in [1, k]$ is obtained, where O is a triplet (s, m, l), s is a start time (in unit of ms) of the triplet, m is a note value of the triplet, l is a duration (in unit of ms) of the triplet, and k is a quantity of triplets included in the triplet sequence. Therefore, note information of the valid audio segments is obtained.

In step S1204, perform back-end normalization.

Triplets $W_i$ corresponding to all n single-sentence audio segments $x_1$ are combined. A start time s of a triplet corresponding to each sentence and a start time of the sentence in the entire song may be directly combined to obtain a triplet sequence $W_a=O_i i \in [1, t]$ corresponding to the entire song, where i is used to represent the $i^{th}$, and t is used to represent a total quantity of triplets in this triplet sequence. A singular note is removed. When a triplet satisfies one of the following conditions (1) to (3) (i>1 and i<t), $O_i$ is specially processed (where $m_i$ is a note value of the $i^{th}$ triplet, $m_{i-1}$ is a note value of the $(i-1)^{th}$ triplet, and $m_{i+1}$ is a note value of the $(i+1)^{th}$ triplet):

$$|m_i - m_{i-1}| \geq 6; \quad (1)$$

$$|m_i - m_{i+1}| \geq 6; \text{ and} \quad (2)$$

$$|m_{i-1} - m_{i+1}| \leq 3. \quad (3)$$

Triplets are processed as follows:

When $s_i = s_{i-1} + l_{i-1}$ is true, the $(i-1)^{th}$ triplet and the $i^{th}$ triplet are merged, that is, a duration $l'_{i-1}$ of the $(i-1)^{th}$ triplet is calculated based on $l'_{i-1} = l_{i-1} + l_i$, and the $i^{th}$ triplet is deleted, where $s_i$ is a start time of the $i^{th}$ triplet, $s_{i-1}$ is a start time of the $(i-1)^{th}$ triplet, $l_{i-1}$ is a duration of the $(i-1)^{th}$ triplet, and $l_i$ is a duration of the $i^{th}$ triplet.

When $s_i = s_{i-1} + l_{i-1}$ is untrue and $s_{i+1} = s_i + l_i$ is true, a duration $l'_{i+1}$ of the $(i+1)^{th}$ triplet is calculated based on $l'_{i+1} = l_{i+1} + l_i$, a start time $s'_{i+1}$ of the $(i+1)^{th}$ triplet is calculated based on $s'_{i+1} = s_i$, and the $i^{th}$ triplet is deleted, where $s_{i+1}$ is the start time of the $(i+1)^{th}$ triplet, and $l_{i+1}$ is a duration of the $(i+1)^{th}$ triplet.

When $s_i = s_{i-1} + l_{i-1}$ is untrue and $s_{i+1} = s_i + l_i$ is untrue, the $i^{th}$ triplet is directly deleted.

In this embodiment of this application, a digital score file is generated by using a candidate cappella audio file, the candidate cappella audio file including cappella data obtained when a user sings a song corresponding to the candidate cappella audio file. Therefore, the digital score file is automatically generated by using the voice of the user without manual production, digital score file production costs are reduced, and digital score file production efficiency is improved.

The application environment of the embodiments of this application may be, but not limited to, the application environment in the foregoing embodiment, and details are not described in this embodiment. An embodiment of this application provides a specific optional application for implementing the foregoing information obtaining and transmission method.

FIG. 13 is a schematic diagram of a visual format of a digital score file generated based on note information of each valid audio segment according to an embodiment of this application. As shown in FIG. 13, a visual format of a digital score file is: In a triplet sequence, each row (for example, 36000 150 55) represents a triplet, a first column (for example, 36000 36150 36200 36330 36960) is a start time (in unit of ms) of a note, a second column (for example, 150 50 130 630 30) is a duration (in unit of ms) of the note, and a third column (for example, 55 56 57 56 55) is a note value of the note.

In the application "Quanmin K Ge", each available song has a corresponding MIDI file. This file describes a pitch trend of the song performed by an original singer. Accordingly, this file is a usable MIDI file, and has many functions, for example, providing a visual pitch reference curve for a user, tuning a defective part of the user, and evaluating singing of the user. Because previous MIDI files are all produced manually, manual costs are relatively high, and no effective method is available for inspecting quality of a finished MIDI file. However, in this embodiment of this application, a candidate cappella audio file is obtained; the candidate cappella audio file is divided to obtain a plurality of valid audio segments; note information of each valid audio segment is extracted, the note information including one or more triplets, and each triplet including a start time of a note, a duration of the note, and a note value of the note in a mapping relationship; and a digital score file is generated based on the note information of each valid audio segment, the digital score file including some or all of the triplets. As the digital score file is generated based on the cappella data obtained when the user sings the song corresponding to the candidate cappella audio file, automatic digital score file generation is achieved, and digital score file production efficiency is improved, thereby resolving a technical problem of low digital score file production efficiency in related technologies.

It should be noted that, for brevity, the foregoing method embodiments are described as a series of actions, but persons skilled in the art should understand that this application is not limited to the order of the described actions, because some steps may be performed in other orders or performed simultaneously according to this application. In addition, persons skilled in the art should also understand that all the embodiments described in the specification are exemplary embodiments, and the related actions and modules are not necessarily mandatory to this application.

Based on the foregoing descriptions of the implementations, persons skilled in the art may clearly understand that the methods in the foregoing embodiments may be implemented by software plus a suitable hardware platform or by hardware. Based on such an understanding, the technical solutions of the embodiments of this application, or the part contributing to the related technologies may be implemented in the form of a software product. The computer software product is stored in a storage medium (such as a read-only memory (ROM)/random-access memory (RAM), a magnetic disk, or an optical disk), and includes instructions for instructing a terminal device (which may be a mobile phone, a computer, a server, a network device, or the like) to perform the methods according to the embodiments of this application.

Figure 14:
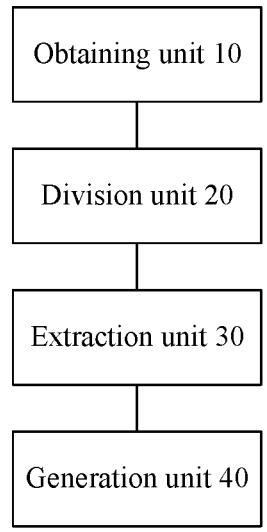
FIG. 14 is a schematic diagram of an apparatus for generating a digital score file of a song according to an embodiment of this application.

According to an embodiment of this application, an apparatus (or an information processing apparatus) for generating a digital score file of a song configured to implement the method for generating a digital score file of a song is further provided. FIG. 14 is a schematic diagram of an apparatus for generating a digital score file of a song according to an embodiment of this application. As shown in FIG. 14, the apparatus may include: an obtaining unit 10, a division unit 20, an extraction unit 30, and a generation unit 40.

The obtaining unit 10 is configured to obtain a candidate cappella audio file satisfying a first condition from cappella audio files corresponding to a song, the cappella audio file including cappella data obtained when a user sings the song.

The division unit 20 is configured to divide the candidate cappella audio file based on time information of the song to obtain a plurality of valid audio segments.

The extraction unit 30 is configured to extract note information of each valid audio segment, the note information including one or more triplets, and each triplet including a start time of a note, a duration of the note, and a note value of the note in a mapping relationship.

The generation unit 40 is configured to generate a digital score file based on the note information of each valid audio segment, the digital score file including some or all of the triplets.

Note that, the obtaining unit 10, the division unit 20, the extraction unit 30, and the generation unit 40 may run in a terminal as a part of the apparatus. Functions implemented by the units may be performed by a processor of the terminal. The terminal may be a terminal device such as a smartphone (such as an Android mobile phone or an iOS mobile phone), a tablet computer, a palmtop computer, and a mobile Internet device (MID), or a PAD.

Figure 15:
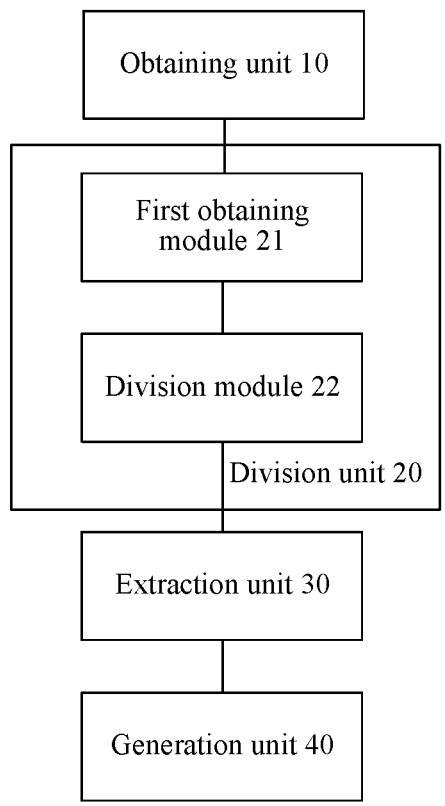
FIG. 15 is a schematic diagram of another apparatus for generating a digital score file of a song according to an embodiment of this application.

FIG. 15 is a schematic diagram of another apparatus for generating a digital score file of a song according to an embodiment of this application. As shown in FIG. 15, the apparatus may include: an obtaining unit 10, a division unit 20, an extraction unit 30, and a generation unit 40. The division unit 20 includes: a first obtaining module 21 and a division module 22.

Note that, the obtaining unit 10, the division unit 20, the extraction unit 30, and the generation unit 40 in this embodiment have the same functions as those in the apparatus for generating a digital score file of a song in the embodiment shown in FIG. 14, and details are not described herein again.

The first obtaining module 21 is configured to obtain a lyric file corresponding to the song, where the lyric file includes time information corresponding to each sentence of lyrics.

The division module 22 is configured to divide the candidate cappella audio file based on the time information corresponding to each sentence of lyrics in the lyric file, to obtain the plurality of valid audio segments.

Note herein that, the first obtaining module 21 and the division module 22 may run in a terminal as a part of the apparatus. Functions implemented by the modules may be performed by a processor of the terminal. The terminal may be a terminal device such as a smartphone (such as an Android mobile phone or an iOS mobile phone), a tablet computer, a palmtop computer, an MID, or a PAD.

Figure 16:
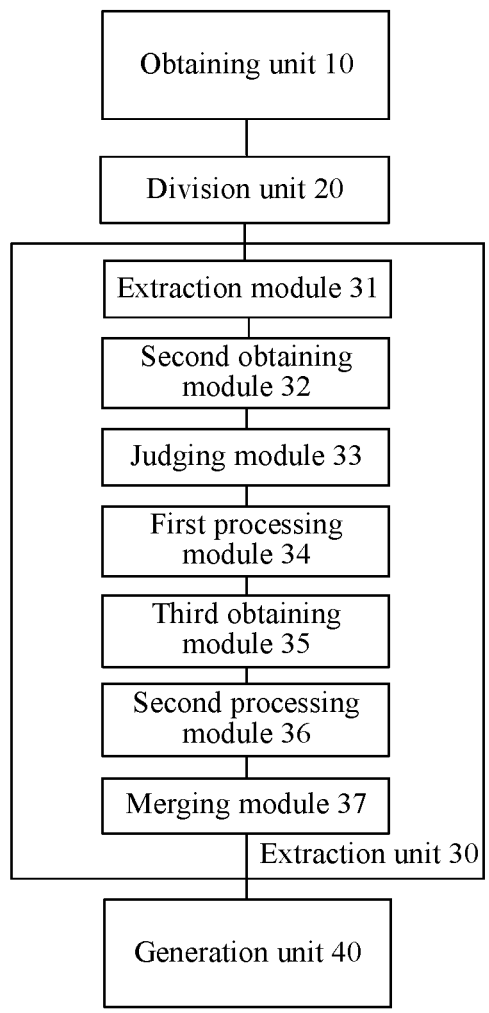
FIG. 16 is a schematic diagram of another apparatus for generating a digital score file of a song according to an embodiment of this application.

FIG. 16 is a schematic diagram of another apparatus for generating a digital score file of a song according to an embodiment of this application. As shown in FIG. 16, the apparatus may include: an obtaining unit 10, a division unit 20, an extraction unit 30, and a generation unit 40. The extraction unit 30 includes: an extraction module 31, a second obtaining module 32, a judging module 33, a first processing module 34, a third obtaining module 35, a second processing module 36, and a merging module 37.

Note that, the obtaining unit 10, the division unit 20, the extraction unit 30, and the generation unit 40 have the same functions as those in the apparatus for generating a digital score file of a song in the embodiment shown in FIG. 14, and details are not described herein again.

The extraction module 31 is configured to extract fundamental frequency information of each valid audio segment, where the fundamental frequency information includes a fundamental frequency value of the audio segment.

The second obtaining module 32 is configured to obtain a sum of play lengths of audio segments having a non-zero fundamental frequency value in the plurality of valid audio segments.

The judging module 33 is configured to determine whether the sum of the play lengths exceeds a preset time.

The first processing module 34 is configured to process each valid audio segment to obtain a fundamental frequency band when the sum of the play lengths exceeds the preset time.

Optionally, after it is determined whether the sum of the play lengths exceeds the preset time, if it is determined that the sum of the play lengths does not exceed the preset time, that is, the sum of the play lengths of the audio segments having a non-zero fundamental frequency value is relatively short, it is determined that the valid audio segments do not satisfy the condition, and cannot be used to obtain a fundamental frequency band. Alternatively, fundamental frequency information of each valid audio segment is re-extracted, a sum of play lengths of audio segments having a non-zero fundamental frequency value in the plurality of valid audio segments is re-obtained, and it is re-determined whether the sum of the play lengths exceeds the preset time. If the sum of the play lengths still does not exceed the preset time, it is directly determined that the valid audio segments do not satisfy the condition, and cannot be used to obtain a fundamental frequency band. Alternatively, the valid audio segments are not processed.

The third obtaining module 35 is configured to obtain fundamental frequency values in the fundamental frequency band.

The second processing module 36 is configured to perform notation processing on the fundamental frequency values to obtain note values of the fundamental frequency values.

The merging module 37 is configured to merge the note values to obtain note information of the valid audio segments.

Note that, the extraction module 31, the second obtaining module 32, the judging module 33, the first processing module 34, the third obtaining module 35, the second processing module 36, and the merging module 37 may run in a terminal as a part of the apparatus. Functions implemented by the modules may be performed by a processor of the terminal. The terminal may be a terminal device such as a smartphone (such as an Android mobile phone or an iOS mobile phone), a tablet computer, a palmtop computer, an MID, or a PAD.

Optionally, the apparatus for generating a digital score file of a song further includes: a calculation unit, a first judging unit, and a zero setting unit. The obtaining unit 10 is configured to: before the sum of the play lengths of the audio segments having a non-zero fundamental frequency value in the plurality of valid audio segments is obtained, obtain fundamental frequency values of adjacent audio segments in the plurality of valid audio segments. The calculation unit is configured to calculate a difference between the fundamental frequency values of the adjacent audio segments. The zero setting unit is configured to set the fundamental frequency values of the adjacent audio segments to zero if the difference satisfies a second condition.

Note that, the calculation unit, the first judging unit, and the zero setting unit may run in a terminal as a part of the apparatus. Functions implemented by the units may be performed by a processor of the terminal. The terminal may be a terminal device such as a smartphone (such as an Android mobile phone or an iOS mobile phone), a tablet computer, a palmtop computer, an MID, or a PAD.

Optionally, the merging module 37 includes a generation module and a combination module. The generation module is configured to merge same note values in the note values, and generate triplets corresponding to the plurality of valid audio segments. The combination module is configured to combine the triplets corresponding to the plurality of valid audio segments into a first triplet sequence for indicating the note information.

Note that, the generation module and the combination module may run in a terminal as a part of the apparatus. Functions implemented by the modules may be performed by a processor of the terminal. The terminal may be a terminal device such as a smartphone (such as an Android mobile phone or an iOS mobile phone), a tablet computer, a palmtop computer, an MID, or a PAD.

Optionally, the generation module is configured to obtain the same note values, start times of the triplets corresponding to the plurality of valid audio segments, and durations of the triplets corresponding to the plurality of valid audio segments, and generate the triplets corresponding to the plurality of valid audio segments based on the same note values, the start times of the triplets corresponding to the plurality of valid audio segments, and the durations of the triplets corresponding to the plurality of valid audio segments.

Optionally, the first triplet sequence includes a first triplet and a second triplet, and the generation unit 40 is configured to: when a start time of the first triplet is equal to a sum of a start time of the second triplet and a duration of the second triplet, merge the first triplet and the second triplet to obtain a third triplet, and delete the first triplet from the first triplet sequence to obtain a second triplet sequence; when the start time of the first triplet is not equal to the sum of the start time of the second triplet and the duration of the second triplet and when a start time of a fourth triplet is equal to a sum of the start time of the first triplet and a duration of the first triplet, merge the fourth triplet and the first triplet to obtain a fifth triplet, and delete the first triplet from the first triplet sequence to obtain a second triplet sequence; when the start time of the first triplet is not equal to the sum of the start time of the second triplet and the duration of the second triplet and when the start time of the fourth triplet is not equal to the sum of the start time of the first triplet and the duration of the first triplet, delete the first triplet from the first triplet sequence to obtain a second triplet sequence; and output triplets in the second triplet sequence in a preset format to obtain the digital score file.

Optionally, when $s_i=s_{i-1}+l_{i-1}$ is true, a duration $l'_{i-1}$ of the third triplet is calculated based on $l'_{i-1}=l_{i-1}+l_i$, where $s_i$ is the start time of the first triplet, $s_{i-1}$ is the start time of the second triplet, $l_{i-1}$ is the duration of the second triplet, and ii is the duration of the first triplet. When $s_i=s_{i-1}+l_{i-1}$ is untrue and $s_{i+1}=s_{i+1}+l_i$ is true, a duration $l'_{i+1}$ of the fifth triplet is calculated based on $l'_{i+1}=l_{i+1}+l_i$, and a start time $s'_{i+1}$ of the fifth triplet is calculated based on $s'_{i+1}=s_i$, where $s_{i+1}$ is the start time of the fourth triplet, and $l_{i+1}$ is a duration of the fourth triplet.

Figure 17:
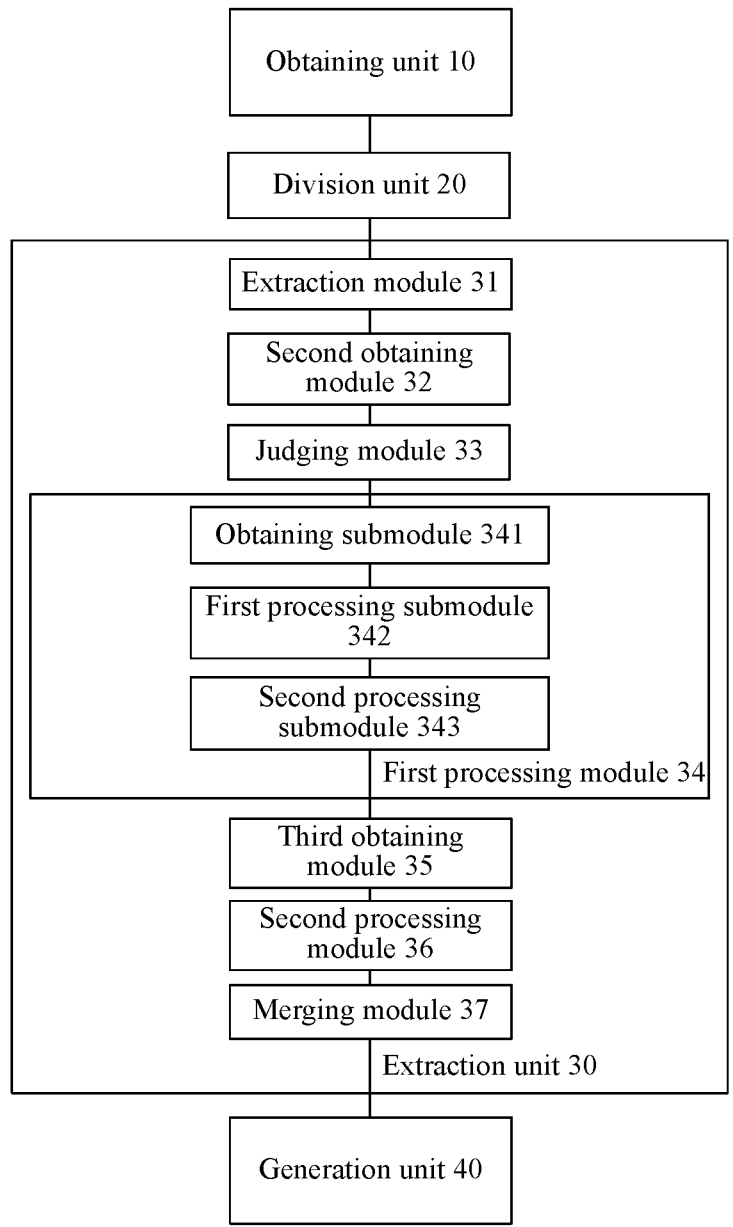
FIG. 17 is a schematic diagram of another apparatus for generating a digital score file of a song according to an embodiment of this application.

FIG. 17 is a schematic diagram of another apparatus for generating a digital score file of a song according to an embodiment of this application. As shown in FIG. 17, the apparatus may include: an obtaining unit 10, a division unit 20, an extraction unit 30, and a generation unit 40. The extraction unit 30 includes: an extraction module 31, a second obtaining module 32, a judging module 33, a first processing module 34, a third obtaining module 35, a second processing module 36, and a merging module 37. The first processing module 34 includes: an obtaining submodule 341, a first processing submodule 342, and a second processing submodule 343.

Note that, the obtaining unit 10, the division unit 20, the extraction unit 30, the generation unit 40, the extraction module 31, the second obtaining module 32, the judging module 33, the first processing module 34, the third obtaining module 35, the second processing module 36, and the merging module 37 in this embodiment have the same functions as those in the apparatus for generating a digital score file of a song in the embodiment shown in FIG. 16, and details are not described herein again.

The obtaining submodule 341 is configured to obtain a length corresponding to each valid audio segment.

The first processing submodule 342 is configured to perform first filtering processing on a valid audio segment having a length less than a first preset value, to obtain a first filtered segment.

The second processing submodule 343 is configured to perform second filtering processing on an audio segment having a length greater than or equal to the first preset value, to obtain a second filtered segment.

The third obtaining module 35 is configured to obtain a fundamental frequency value of the first filtered segment and a fundamental frequency value of the second filtered segment.

Note that, the obtaining submodule 341, the first processing submodule 342, and the second processing submodule 343 may run in a terminal as a part of the apparatus. Functions implemented by the modules may be performed by a processor of the terminal. The terminal may be a terminal device such as a smartphone (such as an Android mobile phone or an iOS mobile phone), a tablet computer, a palmtop computer, an MID, or a PAD.

Optionally, the apparatus for generating a digital score file of a song further includes: a second judging unit and a setting unit. The second judging unit is configured to: after the length corresponding to each valid audio segment is obtained, determine whether a zero audio segment exists in valid audio segments having a length less than a second preset value, where the zero audio segment is an audio segment having a zero fundamental frequency value. The setting unit is configured to set a fundamental frequency value of the zero audio segment as a preset fundamental frequency value when it is determined that the zero audio segment exists in the valid audio segments having a length less than the second preset value. The third obtaining module 35 is configured to obtain the fundamental frequency value of the first filtered segment, the fundamental frequency value of the second filtered segment, and the preset fundamental frequency value.

Note that, the second judging unit and the setting unit may run in a terminal as a part of the apparatus. Functions implemented by the units may be performed by a processor of the terminal. The terminal may be a terminal device such as a smartphone (such as an Android mobile phone or an iOS mobile phone), a tablet computer, a palmtop computer, an MID, or a PAD.

Optionally, the obtaining unit 10 includes: a fourth obtaining module, a fifth obtaining module, and a determining module. The fourth obtaining module is configured to obtain a plurality of uploaded original cappella audio files. The fifth obtaining module is configured to obtain reply information of the plurality of original cappella audio files, where the reply information is used to indicate a quality level of each of the original cappella audio files. The determining module is configured to determine the original cappella audio file as the candidate cappella audio file if the quality level indicated in the reply information reaches a predetermined level.

Note that, the fourth obtaining module, the fifth obtaining module, and the determining module may run in a terminal as a part of the apparatus. Functions implemented by the modules may be performed by a processor of the terminal. The terminal may be a terminal device such as a smartphone (such as an Android mobile phone or an iOS mobile phone), a tablet computer, a palmtop computer, an MID, or a PAD.

Note that, the obtaining unit 10 in this embodiment may be configured to perform step S202 in Embodiment 1 of this application, the division unit 20 in this embodiment may be configured to perform step S204 in Embodiment 1 of this application, the extraction unit 30 in this embodiment may be configured to perform step S206 in Embodiment 1 of this application, and the generation unit 40 in this embodiment may be configured to perform step S208 in Embodiment 1 of this application.

In this embodiment, the obtaining unit 10 obtains a candidate cappella audio file satisfying a first condition from cappella audio files corresponding to a song; the division unit 20 divides the candidate cappella audio file based on time information of the song to obtain a plurality of valid audio segments; the extraction unit 30 extracts note information of each valid audio segment, the note information including one or more triplets, and each triplet including a start time of a note, a duration of the note, and a note value of the note in a mapping relationship; and the generation unit 40 generates a digital score file based on the note information of each valid audio segment, the digital score file including some or all of the triplets. As the digital score file is generated based on the cappella data obtained when the user sings the song corresponding to the candidate cappella audio file, automatic digital score file generation is achieved, and digital score file production efficiency is improved, thereby resolving a technical problem of low digital score file production efficiency in related technologies.

Note that, the units and modules have the same implementation example and application scenario as corresponding steps, but are not limited to the content disclosed in Embodiment 1. Note that, as a part of the apparatus, the modules may run in the hardware environment shown in FIG. 1, and may be implemented by software, or may be implemented by hardware. The hardware environment includes a network environment.

The functional modules provided in this embodiment of this application may run in a mobile terminal, a computer terminal, or a similar computing apparatus, or may be stored as a part of a storage medium.

Accordingly, an embodiment of this application may provide a terminal. The terminal may be any computer terminal device in a computer terminal group. Optionally, in this embodiment, the terminal may also be a terminal device such as a mobile terminal.

Optionally, in this embodiment, the terminal may be located in at least one of a plurality of network devices in a computer network.

According to an embodiment of this application, a terminal configured to implement the method for generating a digital score file of a song is further provided. The terminal may be a computer terminal. The computer terminal may be any computer terminal device in a computer terminal group. Optionally, in this embodiment, the computer terminal may also be a terminal device such as a mobile terminal.

Optionally, in this embodiment, the computer terminal may be located in at least one of a plurality of network devices in a computer network.

Figure 18:
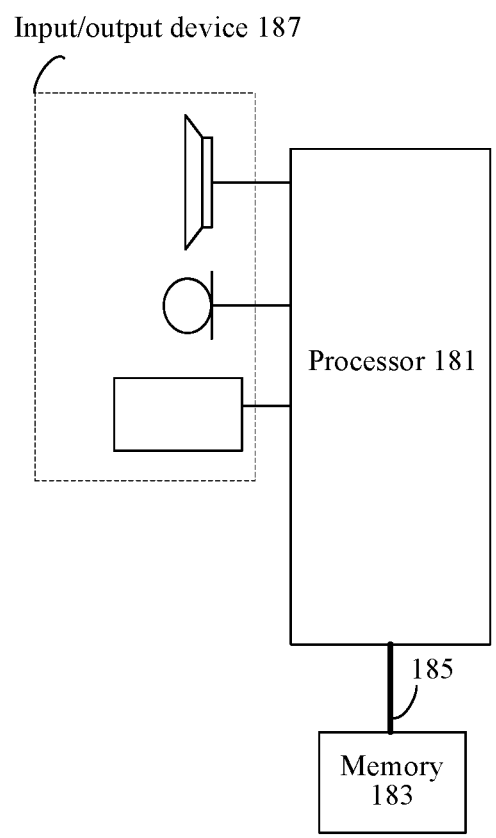
FIG. 18 is a structural block diagram of a terminal according to an embodiment of this application.

FIG. 18 is a structural block diagram of a terminal according to an embodiment of this application. As shown in FIG. 18, the terminal may include: one or more processors 181 (one is shown in the figure), a memory 183, and a transmission apparatus 185. As shown in FIG. 18, the terminal may further include an input/output device 187.

The memory 183 may be configured to store a software program and module, for example, program instructions/modules corresponding to the method and apparatus for generating a digital score file of a song in the embodiments of this application. The processor 181 runs the software program and module stored in the memory 183, to implement various function application and data processing, that is, implement the method for generating a digital score file of a song. The memory 183 may include a high-speed RAM, and may also include a non-volatile memory, for example, one or more magnetic storage apparatuses, a flash memory, or another non-volatile solid-state memory. In some embodiments, the memory 183 may further include a memory disposed remote to the processor 181, and the memory may be connected to the terminal via a network. Examples of the network include but are not limited to: the Internet, an intranet, a local area network, a mobile communications network, and a combination thereof.

The transmission apparatus 185 is configured to receive or send data via a network, and may be further configured to transmit data between the processor and the memory. Specific examples of the network may include a wired network and a wireless network. In an embodiment, the transmission apparatus 185 includes a network interface controller (NIC), which may be connected to another network device and a router by using a network cable, to communicate with the Internet or the local area network. In an embodiment, the transmission apparatus 185 is a radio frequency (RF) module, configured to wirelessly communicate with the Internet.

Specifically, the memory 183 is configured to store an application program.

The processor 181 may invoke, by using the transmission apparatus 185, the application program stored in the memory 183, to execute program code of method steps of optional or exemplary embodiments in the method embodiments, including:

obtaining a candidate cappella audio file satisfying a first condition from cappella audio files corresponding to a song, the cappella audio file including cappella data obtained when a user sings the song;

dividing the candidate cappella audio file based on time information of the song to obtain a plurality of valid audio segments;

extracting note information of each valid audio segment, the note information including one or more triplets, and each triplet including a start time of a note, a duration of the note, and a note value of the note in a mapping relationship; and generating a digital score file based on the note information of each valid audio segment, the digital score file including some or all of the triplets.

The processor 181 is further configured to perform the following steps: obtaining a lyric file corresponding to the song, where the lyric file includes time information corresponding to each sentence of lyrics; and dividing the candidate cappella audio file based on the time information corresponding to each sentence of lyrics in the lyric file, to obtain the plurality of valid audio segments.

The processor 181 is further configured to perform the following steps: extracting fundamental frequency information of each valid audio segment, where the fundamental frequency information includes a fundamental frequency value of the audio segment; obtaining a sum of play lengths of audio segments having a non-zero fundamental frequency value in the plurality of valid audio segments; processing each valid audio segment to obtain a fundamental frequency band if the sum of the play lengths exceeds a preset time; obtaining fundamental frequency values in the fundamental frequency band; performing notation processing on the fundamental frequency values to obtain note values of the fundamental frequency values; and merging the note values to obtain note information of the valid audio segments.

The processor 181 is further configured to perform the following steps: obtaining a length corresponding to each valid audio segment; performing first filtering processing on an audio segment having a length less than a first preset value, to obtain a first filtered segment; performing second filtering processing on an audio segment having a length greater than or equal to the first preset value, to obtain a second filtered segment; and obtaining a fundamental frequency value of the first filtered segment and a fundamental frequency value of the second filtered segment.

The processor 181 is further configured to perform the following steps: after obtaining the length corresponding to each valid audio segment, setting a fundamental frequency value of a zero audio segment as a preset fundamental frequency value if the zero audio segment exists in valid audio segments having a length less than a second preset value, where the zero audio segment is an audio segment having a zero fundamental frequency value; and obtaining the fundamental frequency value of the first filtered segment, the fundamental frequency value of the second filtered segment, and the preset fundamental frequency value.

The processor 181 is further configured to perform the following steps: before obtaining the sum of the play lengths of the audio segments having a non-zero fundamental frequency value in the plurality of valid audio segments, obtaining fundamental frequency values of adjacent audio segments in the plurality of valid audio segments; calculating a difference between the fundamental frequency values of the adjacent audio segments; and setting the fundamental frequency values of the adjacent audio segments to zero if the difference satisfies a second condition.

The processor 181 is further configured to perform the following steps: merging same note values in the note values, and generating triplets corresponding to the plurality of valid audio segments; and combining the triplets corresponding to the plurality of valid audio segments into a first triplet sequence for indicating the note information.

The processor 181 is further configured to perform the following steps: obtaining the same note values, start times of the triplets corresponding to the plurality of valid audio segments, and durations of the triplets corresponding to the plurality of valid audio segments; and generating the triplets corresponding to the plurality of valid audio segments based on the same note values, the start times of the triplets corresponding to the plurality of valid audio segments, and the durations of the triplets corresponding to the plurality of valid audio segments.

The processor 181 is further configured to perform the following steps: when a start time of a first triplet (or a first onset time) is equal to a sum of a start time of a second triplet (or a second onset time) and a duration of the second triplet (or a second duration), merging the first triplet and the second triplet to obtain a third triplet, and deleting the first triplet from the first triplet sequence to obtain a second triplet sequence. In an example, the first triplet and the second triplet form the third triplet in the second triplet sequence. When the start time of the first triplet is not equal to the sum of the start time of the second triplet and the duration of the second triplet and when a start time of a fourth triplet is equal to a sum of the start time of the first triplet and a duration of the first triplet, merging the fourth triplet and the first triplet to obtain a fifth triplet, and deleting the first triplet from the first triplet sequence to obtain a second triplet sequence. In an example, the first triplet and the fourth triplet form the fifth triplet in the second triplet sequence. When the start time of the first triplet is not equal to the sum of the start time of the second triplet and the duration of the second triplet and when the start time of the fourth triplet is not equal to the sum of the start time of the first triplet and the duration of the first triplet, deleting the first triplet from the first triplet sequence to obtain a second triplet sequence; and outputting triplets in the second triplet sequence in a preset format to obtain the digital score file.

The processor 181 is further configured to perform the following steps: when $s_i = s_{i-1} + l_{i-1}$ is true, a duration $l'_{i-1}$ of the third triplet is calculated based on $l'_{i-1} = l_{i-1} + l_i$, where $s_i$ is the start time of the first triplet, $s_{i-1}$ is the start time of the second triplet, $l_{i-1}$ is the duration of the second triplet, and $l_i$ is the duration of the first triplet; and when $s_i=s_{i-1}+l_{i-1}$ is untrue and $s_{i+1}=s_i+l_i$ is true, a duration $l'_{i+1}$ of the fifth triplet is calculated based on $l'_{i+1}=l_{i+1}+l_i$, and a start time $s'_{i+1}$ of the fifth triplet is calculated based on $s'_{i+1}=s_i$, where $s_{i+1}$ is the start time of the fourth triplet, and $l_{i+1}$ is a duration of the fourth triplet.

The processor 181 is further configured to perform the following steps: obtaining a plurality of uploaded original cappella audio files; obtaining reply information of the plurality of original cappella audio files, where the reply information is used to indicate a quality level of each of the original cappella audio files; and determining the original cappella audio file as the candidate cappella audio file if the quality level indicated in the reply information reaches a predetermined level.

In this embodiment of this application, a candidate cappella audio file is obtained; the candidate cappella audio file is divided to obtain a plurality of valid audio segments; note information of each valid audio segment is extracted, the note information including one or more triplets, and each triplet including a start time of a note, a duration of the note, and a note value of the note in a mapping relationship; and a digital score file is generated based on the note information of each valid audio segment, the digital score file including some or all of the triplets. As the digital score file is generated based on the cappella data obtained when the user sings the song corresponding to the candidate cappella audio file, automatic digital score file generation is achieved, and digital score file production efficiency is improved, thereby resolving a technical problem of low digital score file production efficiency in related technologies.

Optionally, for specific examples in this embodiment, refer to the examples described in the foregoing embodiments, and details are not described herein again.

Persons of ordinary skill in the art may understand that, the structure shown in FIG. 18 is merely exemplary, and the terminal may be a terminal device such as a smartphone (such as an Android mobile phone or an iOS mobile phone), a tablet computer, a palmtop computer, an MID, or a PAD. FIG. 18 poses no limitation to the structure of the terminal. For example, the terminal may further include more or few components (for example, a network interface and a display apparatus) than those shown in FIG. 18, or has a configuration different from that shown in FIG. 18.

Persons of ordinary skill in the art may understand that all or some of the steps of the methods in the embodiments may be implemented by a program instructing relevant hardware of the terminal device. The program may be stored in a computer-readable storage medium. The storage medium may include: a USB flash drive, a ROM, a RAM, a magnetic disk, or an optical disc. In an example, the program is stored in a non-transitory computer-readable storage medium.

An embodiment of this application further provides a storage medium. Optionally, in this embodiment, the storage medium may store program code, the program code being used to perform steps in the method for generating a digital score file of a song according to the method embodiments.

Optionally, in this embodiment, the storage medium may be located in any computer terminal in a computer terminal group in a computer network, or may be located in any mobile terminal in a mobile terminal group.

Optionally, in this embodiment, the storage medium is configured to store program code of the following steps: obtaining a candidate cappella audio file satisfying a first condition from cappella audio files corresponding to a song, the cappella audio file including cappella data obtained when a user sings the song;

dividing the candidate cappella audio file based on time information of the song to obtain a plurality of valid audio segments;

extracting note information of each valid audio segment, the note information including one or more triplets, and each triplet including a start time of a note, a duration of the note, and a note value of the note in a mapping relationship; and generating a digital score file based on the note information of each valid audio segment, the digital score file including some or all of the triplets.

Optionally, the storage medium is further configured to store program code of the following steps: obtaining a lyric file corresponding to the song, where the lyric file includes time information corresponding to each sentence of lyrics; and dividing the candidate cappella audio file based on the time information corresponding to each sentence of lyrics in the lyric file, to obtain the plurality of valid audio segments.

The storage medium is further configured to store program code of the following steps: extracting fundamental frequency information of each valid audio segment, where the fundamental frequency information includes a fundamental frequency value of the audio segment; obtaining a sum of play lengths of audio segments having a non-zero fundamental frequency value in the plurality of valid audio segments; processing each valid audio segment to obtain a fundamental frequency band if the sum of the play lengths exceeds a preset time; obtaining fundamental frequency values in the fundamental frequency band; performing notation processing on the fundamental frequency values to obtain note values of the fundamental frequency values; and merging the note values to obtain note information of the valid audio segments.

The storage medium is further configured to store program code of the following steps: obtaining a length corresponding to each valid audio segment; performing first filtering processing on an audio segment having a length less than a first preset value, to obtain a first filtered segment; performing second filtering processing on an audio segment having a length greater than or equal to the first preset value, to obtain a second filtered segment; and obtaining a fundamental frequency value of the first filtered segment and a fundamental frequency value of the second filtered segment.

The storage medium is further configured to store program code of the following steps: after obtaining the length corresponding to each valid audio segment, setting a fundamental frequency value of a zero audio segment as a preset fundamental frequency value if the zero audio segment exists in valid audio segments having a length less than a second preset value, where the zero audio segment is an audio segment having a zero fundamental frequency value; and obtaining the fundamental frequency value of the first filtered segment, the fundamental frequency value of the second filtered segment, and the preset fundamental frequency value.

The storage medium is further configured to store program code of the following steps: before obtaining the sum of the play lengths of the audio segments having a non-zero fundamental frequency value in the plurality of valid audio segments, obtaining fundamental frequency values of adjacent audio segments in the plurality of valid audio segments; calculating a difference between the fundamental frequency values of the adjacent audio segments; and setting the fundamental frequency values of the adjacent audio segments to zero if the difference satisfies a second condition.

The storage medium is further configured to store program code of the following steps: merging same note values in the note values, and generating triplets corresponding to the plurality of valid audio segments; and combining the triplets corresponding to the plurality of valid audio segments into a first triplet sequence for indicating the note information.

The storage medium is further configured to store program code of the following steps: obtaining the same note values, start times of the triplets corresponding to the plurality of valid audio segments, and durations of the triplets corresponding to the plurality of valid audio segments; and generating the triplets corresponding to the plurality of valid audio segments based on the same note values, the start times of the triplets corresponding to the plurality of valid audio segments, and the durations of the triplets corresponding to the plurality of valid audio segments.

The storage medium is further configured to store program code of the following steps: when a start time of a first triplet is equal to a sum of a start time of a second triplet and a duration of the second triplet, merging the first triplet and the second triplet to obtain a third triplet, and deleting the first triplet from the first triplet sequence to obtain a second triplet sequence; when the start time of the first triplet is not equal to the sum of the start time of the second triplet and the duration of the second triplet and when a start time of a fourth triplet is equal to a sum of the start time of the first triplet and a duration of the first triplet, merging the fourth triplet and the first triplet to obtain a fifth triplet, and deleting the first triplet from the first triplet sequence to obtain the second triplet sequence; when the start time of the first triplet is not equal to the sum of the start time of the second triplet and the duration of the second triplet and when the start time of the fourth triplet is not equal to the sum of the start time of the first triplet and the duration of the first triplet, deleting the first triplet from the first triplet sequence to obtain the second triplet sequence; and outputting triplets in the second triplet sequence in a preset format to obtain the digital score file.

The storage medium is further configured to store program code of the following steps: when $s_i=s_{i-1}+l_{i-1}$ is true, a duration $l'_{i-1}$ of the third triplet is calculated based on $l'_{i-1}=l_{i-1}+l_i$, where $s_i$ is the start time of the first triplet, $s_{i-1}$ is the start time of the second triplet, $l_{i-1}$ is the duration of the second triplet, and $l_i$ is the duration of the first triplet; and when $s_i=s_{i-1}+l_{i-1}$ is untrue and $s_{i+1}=s_i+l_i$ is true, a duration $l'_{i+1}$ of the fifth triplet is calculated based on $l'_{i+1}=l_{i+1}+l_i$, and a start time $s'_{i+1}$ of the fifth triplet is calculated based on $s'_{i+1}=s_i$, where $s_{i+1}$ is the start time of the fourth triplet, and $l_{i+1}$ is a duration of the fourth triplet.

The storage medium is further configured to store program code of the following steps: obtaining a plurality of uploaded original cappella audio files; obtaining reply information of the plurality of original cappella audio files, where the reply information is used to indicate a quality level of each of the original cappella audio files; and determining the original cappella audio file as the candidate cappella audio file if the quality level indicated in the reply information reaches a predetermined level.

Optionally, for specific examples in this embodiment, refer to the examples described in the foregoing embodiments, and details are not described herein again.

Optionally, in this embodiment, the storage medium may include, but not limited to, various media that can store program code, such as a USB flash drive, a ROM, a RAM, a removable hard disk, a magnetic disk, or an optical disc.

The method and the apparatus for generating a digital score file of a song, and the storage medium according to this application are described above with reference to the accompanying drawings by using examples. However, persons skilled in the art should understand that, to the method and the apparatus for generating a digital score file of a song, and the storage medium proposed in this application, various improvements may be made without departing from the content of this application. Therefore, the protection scope of this application should be determined by the contents of the appended claims.

The sequence numbers of the foregoing embodiments of this application are for description, and do not imply the preference among the embodiments.

When the integrated unit in the foregoing embodiments is implemented in the form of a software functional unit and sold or used as an independent product, the integrated unit may be stored in a computer-readable storage medium. Based on such an understanding, the technical solutions of this application, or the part contributing to the related technologies, or all or some of the technical solutions may be implemented in the form of a software product. The software product is stored in a storage medium and includes instructions for instructing one or more computer devices (which may be a PC, a server, or a network device) to perform all or some of the steps of the methods described in the embodiments of this application.

In the foregoing embodiments of this application, the description of each embodiment has respective focuses, and for the part that is not detailed in an embodiment, reference may be made to the relevant description of other embodiments.

In the several embodiments provided in this application, it should be understood that the disclosed apparatus may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the units or modules may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual need to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

The foregoing descriptions are exemplary implementations of this application. It should be noted that, persons of ordinary skill in the art may make several improvements or polishing without departing from the principle of this application, and the improvements or polishing shall fall within the protection scope of this application.

INDUSTRIAL APPLICABILITY

In the embodiments of this application, a candidate cappella audio file satisfying a first condition is obtained from cappella audio files corresponding to a song, the candidate cappella audio file including cappella data obtained when a user sings a song corresponding to the candidate cappella audio file; the candidate cappella audio file is divided based on time information of the song to obtain a plurality of valid audio segments; note information of each valid audio segment is extracted, the note information including one or more triplets, and each triplet including a start time of a note, a duration of the note, and a note value of the note in a mapping relationship; and a digital score file is generated based on the note information of each valid audio segment, the digital score file including some or all of the triplets. As the digital score file is generated based on the cappella data obtained when the user sings the song corresponding to the candidate cappella audio file, automatic digital score file generation is achieved, and digital score file production efficiency is improved, thereby resolving a technical problem of low digital score file production efficiency in related technologies.

What is claimed is:

1. A method for generating a digital score file that records musical notation of a song, comprising:
    obtaining, by processing circuitry of an information processing apparatus, audio files of unaccompanied singing of the song without instrumental accompaniment, the audio files being uploaded to the information processing apparatus;
    obtaining reply information corresponding to the audio files;
    determining quality levels of the audio files based on the reply information;
    identifying a candidate audio file from the audio files, a corresponding quality level of the candidate audio file from the determined quality levels being greater than a threshold; and
    after the candidate audio file is identified, generating the digital score file that records the musical notation of the song according to the candidate audio file, the generating the digital score file including:
        dividing, by the processing circuitry of the information processing apparatus, the candidate audio file into valid audio segments based on timing information of the song;
        extracting pieces of music note information from the valid audio segments, each of the pieces of music note information including at least one data set of a music note in the song, the data set including an onset time, a duration, and a music note value of the music note; and
        generating the digital score file based on the pieces of music note information.

2. The method according to claim 1, wherein the dividing the candidate audio file into the valid audio segments comprises:
    obtaining a lyric file corresponding to the song, the lyric file including pieces of line timing information corresponding to lyric lines of the song; and
    dividing the candidate audio file into the valid audio segments based on the pieces of line timing information.

3. A method for generating a digital score file that records musical notation of a song, comprising:
    obtaining, by processing circuitry of an information processing apparatus, a candidate audio file satisfying a first condition from audio files of unaccompanied singing of the song without instrumental accompaniment;
    dividing, by the processing circuitry of the information processing apparatus, the candidate audio file into valid audio segments based on timing information of the song;
    extracting pieces of music note information from the valid audio segments, each of the pieces of music note information including at least one data set of a music note in the song, the data set including an onset time, a duration, and a music note value of the music note; and
    generating the digital score file based on the pieces of music note information,
    wherein the extracting the pieces of music note information from the valid audio segments comprises:
    for each of the valid audio segments,
        extracting fundamental frequency information from the respective valid audio segment, the fundamental frequency information including at least one fundamental frequency value associated with the respective valid audio segment, and
        when the at least one fundamental frequency value is not zero, adding a play duration of the respective valid audio segment to a segment duration; and
    when the segment duration exceeds a preset duration,
        processing the respective valid audio segment to obtain at least one fundamental frequency band,
        obtaining the at least one fundamental frequency value from the at least one fundamental frequency band,
        implementing music notation processing on the at least one fundamental frequency value to obtain at least one music note value, and
        merging the music note values for the valid audio segments to obtain the pieces of music note information associated with the valid audio segments.

4. The method according to claim 3, wherein
    the processing the respective valid audio segment includes:
        obtaining a length corresponding to the respective valid audio segment; and
        implementing a first filtering process on the respective valid audio segment to obtain a first filtered segment when the length is less than a first preset value and implementing a second filtering process on the respective valid audio segment to obtain a second filtered segment when the length is greater than or equal to the first preset value; and
    the obtaining the at least one fundamental frequency value includes:
        obtaining the at least one fundamental frequency value based on the first filtered segment when the length is less than the first preset value and obtaining the at least one fundamental frequency value based on the second filtered segment when the length is greater than or equal to the first preset value.

5. The method according to claim 4, further comprising:
    when the length is less than a second preset value and the at least one fundamental frequency value is zero, setting the at least one fundamental frequency value to be a preset fundamental frequency value; and
    obtaining the preset fundamental frequency value.

6. The method according to claim 3, further comprising:
obtaining the fundamental frequency values associated with adjacent pairs of the valid audio segments;
calculating a difference between the fundamental frequency values; and
setting the fundamental frequency values to zero when the difference satisfies a second condition.

7. The method according to claim 3, wherein the merging the music note values comprises:
merging adjacent music note values that are identical to generate updated music note values of updated music notes,
generating, based on the updated music note values, multiple data sets of the updated music notes, the multiple data sets corresponding to the valid audio segments; and
combining the multiple data sets of the updated music notes into a first sequence indicating the pieces of music note information.

8. The method according to claim 7, wherein the generating the multiple data sets of the updated music notes further comprises:
obtaining respective onset times and durations associated with the updated music notes that correspond to the valid audio segments, and
generating the multiple data sets corresponding to the valid audio segments based on the respective onset times, the durations, and the updated music note values of the updated music notes.

9. The method according to claim 7, wherein
the first sequence includes a first data set of the multiple data sets and a second data set of the multiple data sets, the first data set including a first onset time and a first duration, the second data set including a second onset time and a second duration; and
the method further includes:
when the first onset time is equal to a sum of the second onset time and the second duration, merging the first data set and the second data set to obtain a second sequence, the first data set and the second data set forming a third data set in the second sequence;
when the first onset time is not equal to the sum of the second onset time and the second duration and when an onset time of a fourth data set of the multiple data sets is equal to a sum of the first onset time and the first duration, merging the fourth data set and the first data set to obtain the second sequence, the fourth data set and the first data set forming a fifth data set in the second sequence;
when the first onset time is not equal to the sum of the second onset time and the second duration and when the onset time of the fourth data set is not equal to the sum of the first onset time and the first duration, deleting the first data set from the first sequence to obtain the second sequence; and
outputting the data sets in the second sequence in a preset format to obtain the digital score file.

10. The method according to claim 9, wherein
when $s_i = s_{i-1} + l_{i-1}$ is true, calculating a duration $l'_{i-1}$ of the third data set based on $l'_{i-1} = l_{i-1} - l_i$, $s_i$ being the first onset time, $s_{i-1}$ being the second onset time, $l_{i-1}$ being the second duration, and $l_i$ being the first duration; and
when $s_i = s_{i-1} + l_{i-1}$ is untrue and $s_{i+1} = s_i + l_i$ is true, calculating a duration $l'_{i+1}$ of the fifth data set using $l'_{i+1} = l_{i+1} + l_i$ and calculating an onset time $s'_{i+1}$ of the fifth data set using $s'_{i+1} = s_i$, $s_{i+1}$ being the onset time of the fourth data set, and $l_{i+1}$ being a duration of the fourth data set.

11. An information processing apparatus, comprising processing circuitry configured to:
obtain audio files of unaccompanied singing of a song without instrumental accompaniment, the audio files being uploaded to the information processing apparatus;
obtain reply information corresponding to the audio files;
determine quality levels of the audio files based on the reply information;
identify a candidate audio file from the audio files, a corresponding quality level of the candidate audio file from the determined quality levels being greater than a threshold; and
after the candidate audio file is identified, generate the digital score file that records musical notation of the song according to the candidate audio file, wherein the processing circuitry is further configured to:
divide the candidate audio file into valid audio segments based on timing information of the song;
extract pieces of music note information from the valid audio segments, each of the pieces of music note information including at least one data set of a music note in the song, the data set including an onset time, a duration, and a music note value of the music note; and
generate a digital score file based on the pieces of music note information.

12. The information processing apparatus according to claim 11, wherein the processing circuitry is further configured to:
obtain a lyric file corresponding to the song, the lyric file including pieces of line timing information corresponding to lyric lines of the song; and
divide the candidate audio file into the valid audio segments based on the pieces of line timing information.

13. The information processing apparatus according to claim 11, wherein the processing circuitry is further configured to:
for each of the valid audio segments,
extract fundamental frequency information from the respective valid audio segment, the fundamental frequency information including at least one fundamental frequency value associated with the respective valid audio segment, and
when the at least one fundamental frequency value is not zero, add a play duration of the respective valid audio segment to a segment duration; and
when the segment duration exceeds a preset duration,
process the respective valid audio segment to obtain at least one fundamental frequency band,
obtain the at least one fundamental frequency value from the at least one fundamental frequency band,
implement music notation processing on the at least one fundamental frequency value to obtain at least one music note value, and
merge the music note values for the valid audio segments to obtain the pieces of music note information associated with the valid audio segments.

14. The information processing apparatus according to claim 13, wherein the processing circuitry is further configured to:
obtain a length corresponding to the respective valid audio segment;
when the length is less than a first preset value,
implement a first filtering process on the respective valid audio segment to obtain a first filtered segment; and obtain the at least one fundamental frequency value based on the first filtered segment; and when the length is greater than or equal to the first preset value, implement a second filtering process on the respective valid audio segment to obtain a second filtered segment; and obtain the at least one fundamental frequency value based on the second filtered segment.

15. The information processing apparatus according to claim 13, wherein the processing circuitry is further configured to:

obtain the fundamental frequency values associated with adjacent pairs of the valid audio segments;

calculate a difference between the fundamental frequency values; and set the fundamental frequency values to zero when the difference satisfies a second condition.

16. The information processing apparatus according to claim 13, wherein the processing circuitry is further configured to:

merge adjacent music note values that are identical to generate updated music note values of updated music notes;

generate, based on the updated music note values, multiple data sets of the updated music notes, the multiple data sets corresponding to the valid audio segments; and combine the multiple data sets of the updated music notes into a first sequence indicating the pieces of music note information.

17. The information processing apparatus according to claim 16, wherein the processing circuitry is further configured to:

obtain respective onset times and durations associated with the updated music notes that correspond to the valid audio segments; and generate the multiple data sets corresponding to the valid audio segments based on the respective onset times, the durations, and the updated music note values of the updated music notes.

18. A non-transitory computer-readable medium storing a program executable by a processor to perform:

obtaining audio files of unaccompanied singing of a song without instrumental accompaniment, the audio files being uploaded to the processor;

obtaining reply information corresponding to the audio files;

determining quality levels of the audio files based on the reply information;

identifying a candidate audio file from the audio files, a corresponding quality level of the candidate audio file from the determined quality levels being greater than a threshold;

after the candidate audio file is identified, generating the digital score file that records musical notation of the song according to the candidate audio file, the generating the digital score file including:

dividing the candidate audio file into valid audio segments based on timing information of the song;

extracting pieces of music note information from the valid audio segments, each of the pieces of music note information including at least one data set of a music note in the song, the data set including an onset time, a duration, and a music note value of the music note; and generating a digital score file based on the pieces of music note information.

19. The non-transitory computer-readable medium according to claim 18, wherein the dividing the candidate audio file into the valid audio segments comprises:

obtaining a lyric file corresponding to the song, the lyric file including pieces of line timing information corresponding to lyric lines of the song; and dividing the candidate audio file into the valid audio segments based on the pieces of line timing information.

20. The non-transitory computer-readable medium according to claim 18, wherein the extracting the pieces of music note information from the valid audio segments comprises:

for each of the valid audio segments, extracting fundamental frequency information from the respective valid audio segment, the fundamental frequency information including at least one fundamental frequency value associated with the respective valid audio segment, and when the at least one fundamental frequency value is not zero, adding a play duration of the respective valid audio segment to a segment duration; and when the segment duration exceeds a preset duration, processing the respective valid audio segment to obtain at least one fundamental frequency band, obtaining the at least one fundamental frequency value from the at least one fundamental frequency band, implementing music notation processing on the at least one fundamental frequency value to obtain at least one music note value, and merging the music note values for the valid audio segments to obtain the pieces of music note information associated with the valid audio segments.

* * * * *